United States Patent
Honarvar et al.

(10) Patent No.: US 7,062,757 B2
(45) Date of Patent: *Jun. 13, 2006

(54) DECISION MANAGEMENT SYSTEM WHICH IS CROSS-FUNCTION, CROSS-INDUSTRY AND CROSS-PLATFORM

(75) Inventors: Laurence Honarvar, Arnold, MD (US); Len Burt, Portland, OR (US)

(73) Assignee: American Management Systems, Inc., Fairfax, VA (US)

(*) Notice: Subject to any disclaimer, the term of this patent is extended or adjusted under 35 U.S.C. 154(b) by 255 days.

This patent is subject to a terminal disclaimer.

(21) Appl. No.: 10/434,344

(22) Filed: May 9, 2003

(65) Prior Publication Data

US 2003/0195828 A1 Oct. 16, 2003

Related U.S. Application Data

(62) Division of application No. 09/219,338, filed on Dec. 23, 1998, now Pat. No. 6,601,034.
(60) Provisional application No. 60/076,910, filed on Mar. 5, 1998.

(51) Int. Cl.
 *G06F 9/44* (2006.01)

(52) U.S. Cl. .................. 717/127; 705/7; 705/38
(58) Field of Classification Search ............... 705/7, 705/10, 38
See application file for complete search history.

(56) References Cited

U.S. PATENT DOCUMENTS

| | | | |
|---|---|---|---|
| 5,177,684 A | 1/1993 | Harker et al. | 364/436 |
| 5,182,793 A | 1/1993 | Alexander et al. | 395/13 |
| 5,404,292 A | 4/1995 | Hendrickson | 364/413.02 |
| 5,481,647 A | 1/1996 | Brody et al. | 395/51 |
| 5,517,405 A | 5/1996 | McAndrew et al. | 364/401 |
| 5,630,127 A | 5/1997 | Moore et al. | 395/615 |

(Continued)

FOREIGN PATENT DOCUMENTS

EP  0 205 873 A2  12/1986

(Continued)

OTHER PUBLICATIONS

"OFX Straight From the Heartland (Innovision Offering Industry's First Cross–Platform OFX–complaint server for online commerce", Bank Technology News, v. 10, n. 12, p. 31+; Dialog File 9, Accession No. 02022692.

Sun Introduces Sun Connect Platform for Web–enabled financial services; Java–Based Environment provides open framework for secure financial translations., Business Wire, p 062330157, Dialog file 16, Accession No. 05094253.

*Primary Examiner*—Romain Jeanty
(74) *Attorney, Agent, or Firm*—Staas & Halsey LLP

(57) ABSTRACT

A computer-implemented rules based decision management system which is cross-platform, cross-industry and cross-function. The decision management system has a software architecture which includes a common code layer, a processing platform layer and a data architecture layer. The common code layer includes a common code kernel simultaneously operable on first and second hardware platforms which are different from each other, and provides software processing to interpret and apply the strategies. The processing platform layer includes a first software module supporting a processing mode for the first hardware platform, and a second software module supporting a processing mode for the second hardware platform. The data architecture layer includes a first data module supporting data storage and access by the first software module, and a second data module supporting data storage and access by the second software module.

9 Claims, 19 Drawing Sheets

U.S. PATENT DOCUMENTS

| | | | |
|---|---|---|---|
| 5,649,116 A | 7/1997 | McCoy et al. ............... 395/238 |
| 5,687,322 A | 11/1997 | Deaton et al. .............. 395/214 |
| 5,696,907 A | 12/1997 | Tom ........................... 395/238 |
| 5,706,406 A | 1/1998 | Pollock ........................ 395/55 |
| 5,732,397 A | 3/1998 | Detore et al. .................. 705/1 |
| 5,819,263 A | 10/1998 | Bromley et al. ............... 707/3 |
| 5,875,236 A | 2/1999 | Jankowitz et al. .......... 379/114 |
| 5,878,403 A | 3/1999 | Defrancesco et al. ......... 705/38 |
| 5,930,764 A | 7/1999 | Melchione et al. ........... 705/10 |
| 5,940,816 A | 8/1999 | Fuhrer et al. .................. 706/13 |
| 5,953,704 A | 9/1999 | McIlroy et al. ................ 705/2 |
| 5,953,707 A | 9/1999 | Huang et al. ................. 705/10 |
| 5,963,910 A | 10/1999 | Ulwick ........................... 705/7 |
| 6,009,420 A | 12/1999 | Fagg, III et al. ............... 706/45 |
| 6,012,051 A | 1/2000 | Sammon, Jr. et al. ........ 706/52 |
| 6,016,477 A | 1/2000 | Ehnebuske et al. ............. 705/7 |
| 6,018,718 A | 1/2000 | Walker et al. ................. 705/14 |
| 6,021,397 A | 2/2000 | Jones et al. ................... 705/36 |
| 6,029,138 A | 2/2000 | Khorasani et al. .............. 705/2 |
| 6,029,149 A | 2/2000 | Dykstra et al. ............... 705/38 |
| 6,029,153 A | 2/2000 | Bauchner et al. ............. 705/42 |
| 6,112,190 A | 8/2000 | Fletcher et al. ............... 705/38 |
| 6,115,691 A | 9/2000 | Ulwick ........................... 705/7 |
| 6,119,103 A | 9/2000 | Basch et al. .................. 705/35 |
| 6,125,359 A | 9/2000 | Lautzenheiser et al. ....... 706/60 |
| 6,128,599 A | 10/2000 | Walker et al. ................. 705/14 |
| 6,151,565 A | 11/2000 | Lobley et al. .................. 703/2 |
| 6,163,604 A | 12/2000 | Baulier et al. ............... 379/189 |
| 6,182,060 B1 | 1/2001 | Hedgcock et al. ............. 707/1 |
| 6,188,988 B1 | 2/2001 | Barry et al. .................... 705/3 |
| 6,236,975 B1 | 5/2001 | Boe et al. ....................... 705/7 |
| 6,249,775 B1 | 6/2001 | Freeman et al. ............. 705/36 |
| 6,275,818 B1 | 8/2001 | Subramanian et al. ......... 707/2 |
| 6,286,005 B1 | 9/2001 | Cannon ..................... 707/100 |
| 6,292,787 B1 | 9/2001 | Scott et al. ................... 705/36 |

FOREIGN PATENT DOCUMENTS

| | | |
|---|---|---|
| EP | 0 230 349 A2 | 7/1987 |
| EP | 0 762 306 A2 | 3/1997 |
| EP | 0 849 693 A2 | 6/1998 |
| EP | 0 915 422 A1 | 5/1999 |
| EP | 1 035 485 A2 | 9/2000 |
| EP | 1 073 249 A2 | 1/2001 |
| EP | 1 102 187 A2 | 5/2001 |
| EP | 1 139 257 A1 | 10/2001 |
| WO | WO 97/09666 | 3/1997 |
| WO | WO 97/29447 | 8/1997 |
| WO | WO 97/34246 | 9/1997 |
| WO | WO 98/49641 | 11/1998 |
| WO | WO 98/49642 | 11/1998 |
| WO | WO 98/54667 | 12/1998 |
| WO | WO 99/09503 | 2/1999 |
| WO | WO 99/13427 | 3/1999 |
| WO | WO 99/39290 | 8/1999 |
| WO | WO 00/34910 | 6/2000 |
| WO | WO 00/34911 | 6/2000 |
| WO | WO 00/54186 | 9/2000 |
| WO | WO 00/57312 | 9/2000 |
| WO | WO 00/65502 | 11/2000 |
| WO | WO 00/72268 A1 | 11/2000 |
| WO | WO 01/16851 A2 | 3/2001 |
| WO | WO 01/39090 A1 | 5/2001 |
| WO | WO 01/39589 A2 | 6/2001 |
| WO | WO 01/45012 A2 | 6/2001 |
| WO | WO 01/46876 A2 | 6/2001 |
| WO | WO 01/50306 A2 | 7/2001 |
| WO | WO 01/50336 A1 | 7/2001 |
| WO | WO 01/57756 A1 | 8/2001 |
| WO | WO 01/61598 A1 | 8/2001 |
| WO | WO 01/75754 A1 | 10/2001 |

|  | BRONZE | GOLD | PLATINUM |
|---|---|---|---|
| TEST GROUP 1 | STRATEGY TEST CELL 1 | STRATEGY TEST CELL 2 | STRATEGY TEST CELL 3 |
| TEST GROUP 2 | STRATEGY TEST CELL 4 | STRATEGY TEST CELL 5 | STRATEGY TEST CELL 6 |
| TEST GROUP 3 | STRATEGY TEST CELL 7 | STRATEGY TEST CELL 8 | STRATEGY TEST CELL 9 |

FIG. 9

| | DIMENSIONS | | | | | METRICS | | | |
|---|---|---|---|---|---|---|---|---|---|
| OBSERVATION TIME | PERFORMANCE TIME | SEGMENT | TEST GROUP | CATEGORY | REPORT GROUP | DEL Q | % CREDIT LINE USED | VALUE | PROFIT |
| 1/98 | 1/98 - 6/98 | 1 | 1 | BRONZE | A | # | # | # | # |
| 1/98 | 1/98 - 6/98 | 1 | 1 | BRONZE | B | # | # | # | # |
| 1/98 | 1/98 - 6/98 | 1 | 1 | BRONZE | C | # | # | # | # |
| 1/98 | 1/98 - 6/98 | 4 | 2 | GOLD | F | # | # | # | # |

{ ACCUMULATED PERFORMANCE DATA }

FIG. 12

| DATE | TEST | DESCRIPTION |
|---|---|---|
| 1/98 ... 6/98 | T1 | TEST 1 |
| 1/98 ... 6/98 | T2 | TEST 2 |
| 2/98 ... 3/98 | T3 | TEST 3 |
| 3/98 ... 9/98 | T4 | TEST 4 |
| 4/98 ... 10/98 | T5 | TEST 5 |

FIG. 13

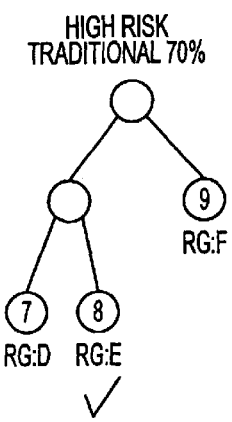
FIG. 14(A)
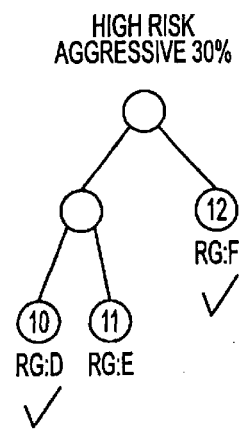
FIG. 14(B)
|  | HIGH RISK | MED RISK | LOW RISK |
|---|---|---|---|
| TRADITIONAL (70%) | 16 | 38 | 16 |
| AGGRESSIVE (30%) | 5 | 20 | 5 |
FIG. 14(C)
|  | HIGH RISK | MED RISK | LOW RISK |
|---|---|---|---|
| TRADITIONAL (70%) | 8 | 38 | 24 |
| AGGRESSIVE (30%) | 2 | 22 | 6 |
FIG. 14(D)

7,062,757 B2

DECISION MANAGEMENT SYSTEM WHICH IS CROSS-FUNCTION, CROSS-INDUSTRY AND CROSS-PLATFORM

CROSS REFERENCE TO RELATED APPLICATION

This application is a divisional of application Ser. No. 09/219,338, filed Dec. 23, 1998, now U.S. Pat. No. 6,601,034.

This application claims priority to provisional application 60/076,910, filed Mar. 5, 1998, and which is incorporated herein by reference.

This application is related to U.S. application Ser. No. 09/217,017 titled DECISION MANAGEMENT SYSTEM FOR CREATING STRATEGIES TO CONTROL MOVEMENT OF CLIENTS ACROSS CATEGORIES, inventor Laurence Honarvar, attorney docket 1330.1003, filed Dec. 21, 1998, and which is incorporated herein by reference.

This application is related to U.S. application Ser. No. 09/216,985 titled SIMULTANEOUS CUSTOMER/ACCOUNT STRATEGY EXECUTION IN A DECISION MANAGEMENT SYSTEM, inventor Laurence Honarvar, attorney docket 1330.1010, filed Dec. 21, 1998, and which is incorporated herein by reference.

This application is related to U.S. application Ser. No. 09/217,016 titled USE OF ONLINE ANALYTICAL PROCESSING (OLAP) IN A RULES BASED DECISION MANAGEMENT SYSTEM, inventors Laurence Honarvar, Steve Campbell, and Traci Showalter, attorney docket 1330.1011, filed Dec. 21, 1998, and which is incorporated herein by reference.

This application is related to U.S. application Ser. No. 09/219,341 titled VERSIONING IN A RULES BASED DECISION MANAGEMENT SYSTEM, inventors Laurence Honarvar, Steve Fatigante and Scott Metzger, attorney docket 1330.1017, filed concurrently herewith, and which is incorporated herein by reference.

This application is related to U.S. application Ser. No. 09/219,340 titled PARAMETER HIERARCHY FOR A DECISION MANAGEMENT SYSTEM, inventors Laurence Honarvar, Steve Fatigante and Scott Metzger, attorney docket 1330.1018, filed concurrently herewith, and which is incorporated herein by reference.

BACKGROUND OF THE INVENTION

1. Field of the Invention

The present invention relates to a cross-function, cross-industry and cross-platform decision management system.

2. Description of the Related Art

A typical organization maintains a significant amount of information about its clients, where clients refer to the customers, accounts or applicants for services of the organization. This information can be effectively used, for example, to increase productivity and reduce costs, while achieving the goals of the organization. Such goals may be to improve profitability and maximize customer value.

For example, a company may sell various products to its customers, and may maintain a significant amount of information relating to its customers. This information can be used to improve many critical interactions with the customers, such as marketing communications, sales calls, customer service, collections, and general relationship management activities.

Consider the following examples.

Assume that a diversified financial services company is trying to leverage its customer base by cross-selling its various products. It currently uses limited internal customer information and credit bureau information to identify existing customers for cross-sell campaigns. For example, they might send "invitations to apply" for a home equity loan to those customers who own a mortgage with the company, and meet a minimum credit bureau score threshold. Imagine how much more powerful their cross-selling efforts would be if they could use information from all of the customers' accounts to offer pre-approved home equity loans to customers where the likelihood of a sale was high, the probability of default was low, and the financial value of that sale was high.

As another example, assume that a regional bell operating company is currently applying only age-based criteria (e.g., "days past due") to its accounts receivable portfolio to identify candidates for its collections department and to handle those customers. The content of the outbound collection notices and phone calls is driven solely by the age and amount of a customer's unpaid balance. Imagine if the company had a tool that helped it select and prioritize collection accounts based on the likelihood of a customer interaction making a bottom line difference. Instead of calling or writing all overdue accounts, they could focus resources on those where the customer interaction would make the greatest difference. In addition, they would save the expense and ill will generated by calling customers who would pay without a collections contact.

As a still further example, assume that a manager of a large telephone customer service center for a super-regional bank has been given only hardline corporate policy to make decisions about fee and rate concessions. While her service reps attempt to stay to the company line, she is deluged with requests from good customers to talk to the manager. She uses her judgment based on the incomplete information available to her to decide which concessions are appropriate to prevent attrition of profitable customers. Just imagine if the service reps had guidelines that were specific to each customer, based upon customer data that indicates their value to the organization, likelihood of attrition, risk level, and other characteristics. The manager could stand by these guidelines with confidence. There would be no concessions made to unprofitable customers, fewer manager overrides, shorter calls, and reduced attrition of the customers they want to keep.

As diverse as the above examples appear on the surface, they share several common characteristics. Each involves a large customer base and a high volume of customer interactions. Each organization has a substantial amount of accumulated data regarding the characteristics, purchasing/behavior patterns, and profitability of customers (though the data may not yet be well organized or analyzed). Each organization has an opportunity to improve performance substantially by treating different customers and customer groups differently, due to diversity in customer relationships and their potential. In each case, there are desired outcomes that could result from alternative customer interactions (e.g., customer purchases a product, pays an outstanding bill, increases deposit balances), and those outcomes can readily be identified, quantified, and tracked.

Therefore, each of the above examples depicts a business situation that currently is not fully benefitting from decision support and therefore is yielding less than optimal results.

There are software-based products in the marketplace which can organize information to make more effective decisions. For example, the American Management Systems (AMS) Strata™ decision support system release 2.0 (hereinafter Strata™ release 2.0) is a software-based system which applies predictive modeling techniques to customer data, to thereby generate dramatic improvements in the effectiveness and profitability of customer interactions.

FIG. 1 is a diagram illustrating the general concept of a software-based decision management system, such as Strata™ release 2.0, which applies predictive modeling techniques to customer data.

Referring now to FIG. 1, a software-based system 10 receives information from operational and/or customer information systems 20, such as, for example, billing systems, account management systems, credit bureau systems and data warehouses. Software-based system 10 prioritizes and tailors customer interactions based on predictive information, specific business rules, and continually evolving decision strategies. Software-based system 10 then determines an appropriate action which is to be taken by an action-taking system 30. An appropriate action to be taken could include, for example, a call to a customer, a specific collections procedure or a specific marketing action.

A decision management system as in FIG. 1 can provide superior results, such as increased revenue generation, improved cost-effectiveness and enhanced customer relationships.

FIG. 2 is a more detailed diagram illustrating the operation of the decision management system Strata™ release 2.0.

Referring now to FIG. 2, in step 40, an inbound event is a trigger that is received from one or more external systems to identify that a particular client event has occurred. Such events may be automatically generated due to client behavior or systematically produced at specified time intervals (i.e., monthly). Examples of inbound events include a customer declaring bankruptcy, a credit underwriting decision request, a credit account delinquency, an income statement cycle date, or a routine evaluation date (a periodic, scheduled evaluation).

From step 40, the system moves to step 50, where a client is assigned to a segment. A segment is a grouping of clients based on a characteristic by which the clients will be separated for applying different rules. Generally, a segment is a high level segregation of clients for the purpose of associating largely independent high level strategy. Segments are completely separate groups of clients, for which a unique set of evaluation processes has been defined. For example, a telecommunications company might have a segment for residential customers and another for business customers.

From step 50, the system moves to step 60, where clients are randomly grouped into different test groups for the purpose of applying competing policy rules, strategy, or experiments. Generally, test groups allow for strategy comparison. Just as in research environments, the behavior or outcome of an experimental "test" population is compared to that of a "control" group that is not exposed to the experimental treatment. A strategist can specify what percentage of the clients should be randomly assigned to each test group. If the strategy associated with a test group is successful, that strategy may later be deployed to a larger percentage of the clients.

From step 60, the system moves to step 70, where inbound events are matched to processes. More specifically, it is defined which processes are invoked in response to each inbound event. For example, different processes are created for a credit card campaign versus a late payment. The order of process execution is also specified.

Processes can be seen as individual decision logic modules which are invoked in response to inbound events. This modular approach to defining decision strategies facilitates logic re-use and the ability to deploy robust strategies required to coordinate customer, account and marketing decisions.

From step 70, the system moves to step 80, where the specific processes for all inbound events coming into the system are executed.

From step 80, the system moves to step 90, where the results, or action to be taken, are output.

Therefore, in FIG. 2, based on the type of inbound event(s) received, an appropriate sequence of decision logic modules, or processes, is invoked, where the sequence of decision logic modules is predefined by a strategy analyst.

FIG. 3 is a diagram illustrating an example of a segment being divided into different test groups as in step 60 of FIG. 2. Referring now to FIG. 3, 10% of the segment is randomly assigned to test group 1, 10% of the segment is randomly assigned to test group 2, and 80% of the segment is randomly assigned to test group 3.

FIGS. 4(A) and 4(B) are diagrams illustrating the matching of inbound events to processes in step 70 of FIG. 2. Referring now to FIG. 4(A), for example, when an inbound event 91 is a credit card campaign, the following processes are applied, in order: credit card propensity to buy score 92, risk score 93 and offer selection 94. A result 95 of the applied processes is a determination of whether to send a credit card offer.

Similarly, referring now to FIG. 4(B), for example, when an inbound event 96 is a late payment, the following processes are applied, in order: risk score 97, underwriting treatment 98 and overdraft decision treatment 99. A result 100 of the applied processes is a determination whether to send new underwriting and overdraft codes.

Processes are decision logic modules formed by one or more "mechanisms". Mechanisms can be, for example, decision trees or score models. There are preferably several different mechanisms which are available in the creation of any process. One or more mechanisms are typically grouped into processes when they have comparable objectives (i.e., score cards to predict risk, decision trees to evaluate a credit line, etc.). Generally, the objective is typically reflected in the name of the process itself as defined by the user.

In this conventional decision management system, only a single set of variables is defined. This single set of variables is written over and used for each process. Subsequent processes write over the data stored in the variables from the previous process. For example, referring to FIG. 4, once a risk score is computed by risk score 93, this computed risk score is stored into a variable which may have stored a score computed by the credit card propensity to buy score 92. Thus, the results of the processes are written over each other into the same set of variables. In this manner, the decision management system has a forced dependency between processes.

FIG. 5 is a diagram illustrating the grouping of mechanisms to processes. Referring now to FIG. 5, when an inbound event 91 triggers a specific process, the specific mechanism to be applied to a client will be determined by the test group into which the client was assigned. This allows for strategy experimentation by defining a common sequence of processes for a given inbound event, but differentiating the actual mechanism that will be invoked for each process depending on the respective test group into which the client was randomly assigned.

If a process only contains one mechanism, no experimentation will take place in that process since every client, regardless of its test group, will be required to use the mechanism. For example, in FIG. 5, no experimentation takes place in the credit card propensity to buy score 92, since this process contains only one mechanism. By contrast, in FIG. 5, experimentation takes place in offer selection 94, since this process includes more than one mechanism. This approach provides the strategy analyst with the flexibility to selectively experiment on each component of the overall strategy, as appropriate.

Processes can include many different types of mechanisms, including decision trees, score models and matrices. Decision trees are the most common.

FIG. 6 is a diagram illustrating a decision tree. A decision tree employs pre-defined logic to route clients to the appropriate endpoint. Generally, a decision tree contains layers of rule-driven decision points, or nodes (starting with a root node at the top of the tree), from which clients are allocated to lower and lower branches of a tree until they ultimately reach an endpoint of the tree (a terminal node). Because decision trees can vary in structure (e.g., number of branches, nodes per branch) and because decision trees can call other decision trees, decision trees provide extensive flexibility for designing client strategies.

The above-described decision management system can allow hybrid strategies to be developed, based on the success of different experiments.

For example, FIG. 7 is a diagram illustrating the effectiveness of creating a hybrid strategy in a decision management system, such as Strata™ release 2.0.

Referring now to FIG. 7, a "test" strategy is applied to test group A, where customers in test group A are divided into two groups, TGA1 and TGA2. Group TGA1 includes all customers less than 40 years old. Group TGA2 includes all customers greater than or equal to 40 years old. A letter is sent to customers whether they are in group TGA1 or TGA2. The end result is that a letter is 60% effective for the customers in TGA1, and 70% effective for customers in TGA2. Assuming that 50% of the population is greater than or equal to 40 years old, and 50% of the population is less than 40 years old, the overall success rate of the test strategy is 65%.

Similarly, a "control" strategy is applied to test group B, where customers in test group B are divided into two groups, TGB1 and TGB2. Group TGB1 includes all customers less than 40 years old. Group TGB2 includes all customers greater than or equal to 40 years old. A call is made to customers whether they are in group TGB1 or TGB2. The end result is that a call is 50% effective for the customers in TGB1, and 90% effective for customers in TGB2. Assuming that 50% of the population is greater than or equal to 40 years old, and 50% of the population is less than 40 years old, the overall success rate of the control strategy is 70%.

An overall comparison of results of test group A (the "test" strategy) versus test group B (the "control" group) indicates that the control strategy is superior, as measured by overall success rate. However, when strategy effectiveness is reported at the comparable path level through the test and control strategies, it is possible to build a new hybrid strategy that will outperform either the test strategy or the control strategy by combining the best performing actions of each strategy. For example, the hybrid strategy would send a letter to all customers less than 40 years old, but call all customers greater than or equal to 40 years old. Such a hybrid strategy should produce an expected overall success rate of 75%, which is higher than either of the test or control strategies.

Such an approach for determining a hybrid strategy could be used, for example, to improve the strategy in offer selection 94 in FIG. 5, where different strategies are applied to different test groups. The formation of a hybrid strategy can significantly increase the effectiveness and profitability of an organization.

The above-described decision management system is cross-function, since it can be used for a variety of non-specific business functions, such as marketing, loan originations and collections. Moreover, the above-described decision management system is cross-industry since it is not limited for use in a specific industry. For example, the decision management system can be used in insurance, financial services, government, telecommunications and transportation industries.

Unfortunately, the above-described decision management system is not cross-platform since it cannot run simultaneously across many technical platforms, such as a mainframe platform, a Microsoft Windows NT/95/98 platform and a Unix platform. Instead, only a single platform must be used. This causes problems since different business operations of an organization, such as marketing and collections, may run on different platforms.

SUMMARY OF THE INVENTION

Therefore, it is an object of the present invention to provide a decision management system which is cross-platform, in addition to being cross-function and cross-industry.

Objects of the present invention are achieved by providing a computer-implemented rules based decision management system which is cross-platform, cross-industry and cross-function. The decision management system has a software architecture which includes a common code layer, a processing platform layer and a data architecture layer.

The common code layer includes a common code kernel simultaneously operable on first and second hardware platforms which are different from each other, and provides software processing to interpret and apply strategies. The processing platform layer includes a first software module supporting a processing mode for the first hardware platform, and a second software module supporting a processing mode for the second hardware platform. The data architecture layer includes a first data module supporting data storage and access by the first software module, and a second data module supporting data storage and access by the second software module.

BRIEF DESCRIPTION OF THE DRAWINGS

Reference will now be made in detail to the present preferred embodiments of the present invention, examples of which are illustrated in the accompanying drawings, wherein like reference numerals refer to like elements throughout.

FIG. 9 is a diagram illustrating a matrix created in a decision management system, for analyzing data and applying strategies, according to an embodiment of the present invention.

FIG. 12 is a diagram illustrating an example of a row of data having a dimensions part and metrics part, according to an embodiment of the present invention.

FIG. 13 is a diagram illustrating a look-up table for a dimension in the row illustrated in FIG. 12, according to an embodiment of the present invention.

FIGS. 14(A), 14(B), 14(C) and 14(D) are diagrams illustrating the operation of a decision management system in optimizing strategy or policy based on results, according to an embodiment of the present invention.

DESCRIPTION OF THE PREFERRED EMBODIMENTS

Figure 8:
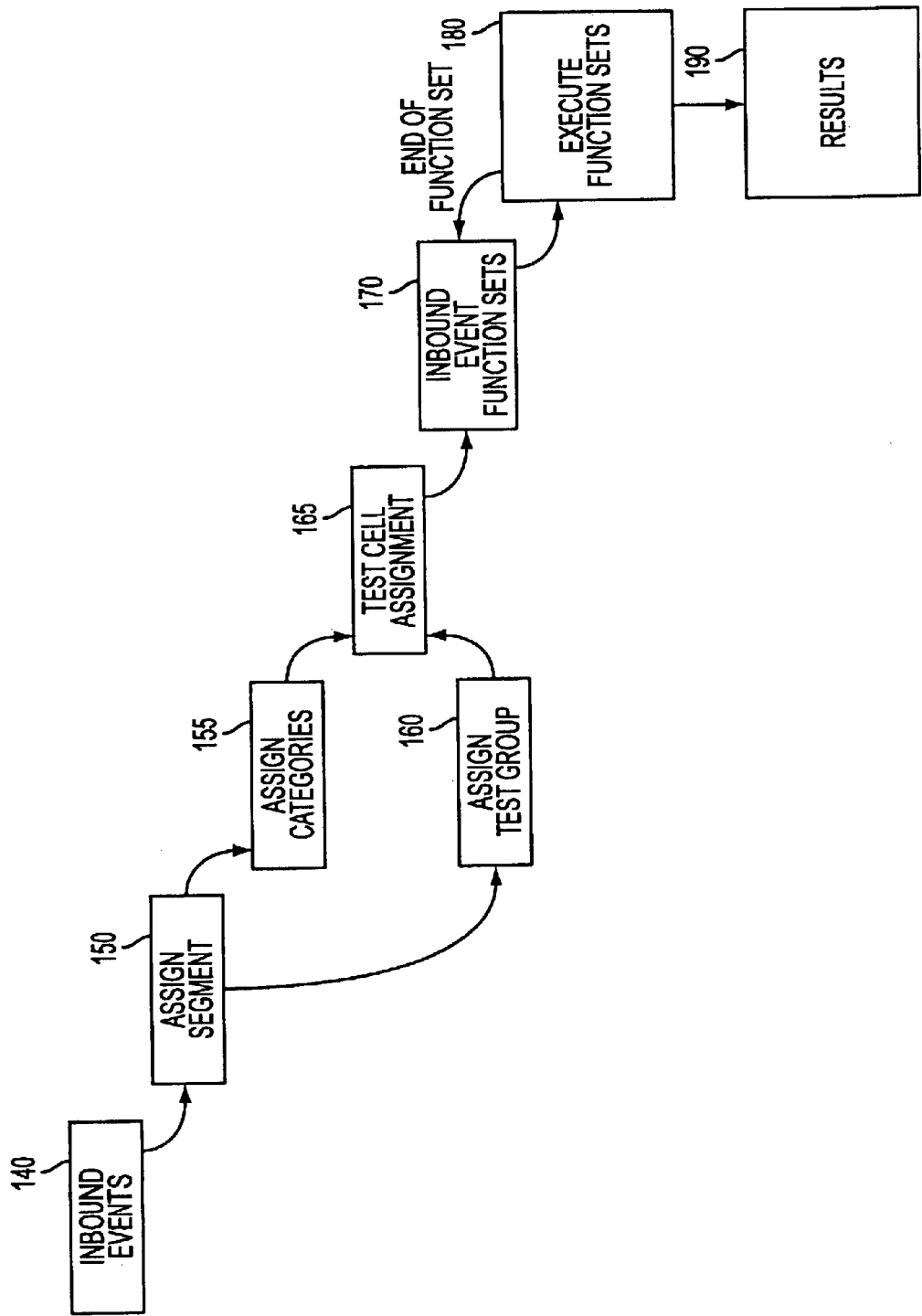
FIG. 8 is a diagram illustrating the functional flow of a decision management system, according to an embodiment of the present invention.

FIG. 8 is a diagram illustrating the functional flow of a decision management system, according to an embodiment of the present invention. Referring now to FIG. 8, in step 140, an inbound event is a trigger that is received from one or more external systems to identify that a particular client event has occurred. Here, a client refers to people or entities which interact with, or do business with, an organization. For example, clients include customers, accounts or applicants for services of the organization.

From step 140, the system moves to step 150, where clients are assigned to different segments. A segment is a grouping of clients based on a characteristic by which the clients will be separated for applying different rules. Generally, a segment is a high-level segregation of clients for the purpose of associating largely independent high-level strategy. Thus, segments are separate groups of clients, for which a unique set of evaluation procedures have been defined. For example, a telecommunications company might have a segment for residential customers and another for business customers. Each segment can have, for example, a separate manager who is the only one with security rights to setup or modify the evaluation procedure for that segment.

From step 150, the system moves to step 155, where each segment is further divided into categories. A category is a grouping of clients as defined by the organization such that it aligns client interaction/value management objectives. In other words, categories represent groups of clients based on how the organization views the clients. For example, a bank may divide clients (such as credit card holders) into the categories of Bronze, Gold, and Platinum, based on how the bank views the credit worthiness of the clients.

From step 150, the system also moves to step 160, where clients are grouped in a random manner into different test groups for the purpose of applying competing policy rules, strategy, or experiments. Thus, steps 155 and 160 can be seen as being performed in parallel and/or having no interdependency.

After steps 155 and 160, each segment has now been divided into test groups and categories. Categories and test groups can be considered to be at the same level in the strategy hierarchy.

From steps 155 and 160, the system moves to step 165, where a matrix is created for each segment, with the categories and test groups on different axes, to create a strategy test cell at the intersection of each category and test group. Here, it is not necessary that a matrix be "physically" created. Instead, the data must simply be organized or arranged in some manner that allows clients to be conceptually represented in a data structure equivalent to a matrix, so that clients can be associated with, or assigned to, strategy test cells.

Figure 1:
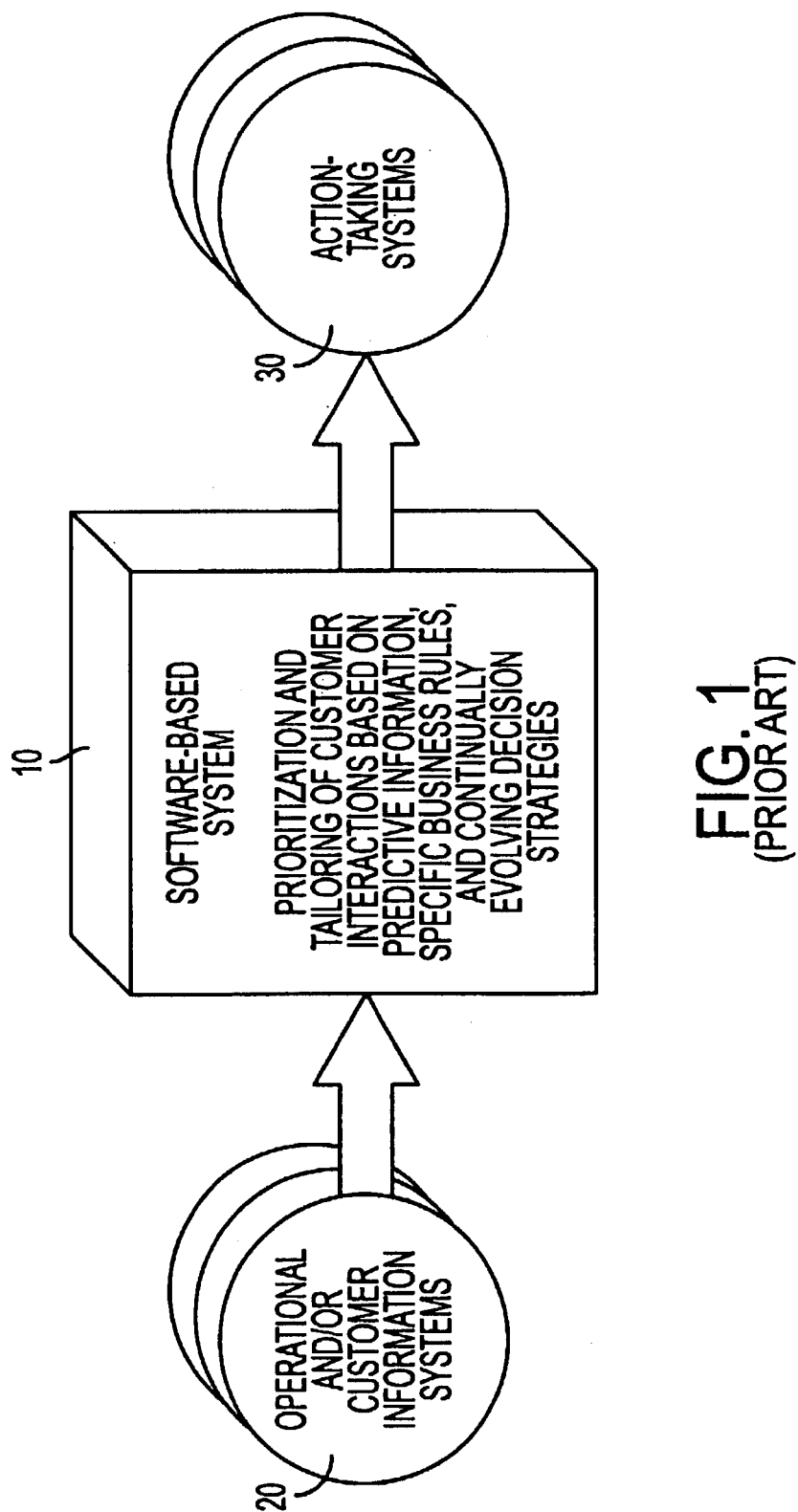
FIG. 1 (prior art) is a diagram illustrating the general concept of a software-based decision management system which applies predictive modeling techniques to customer data.
Figure 2:
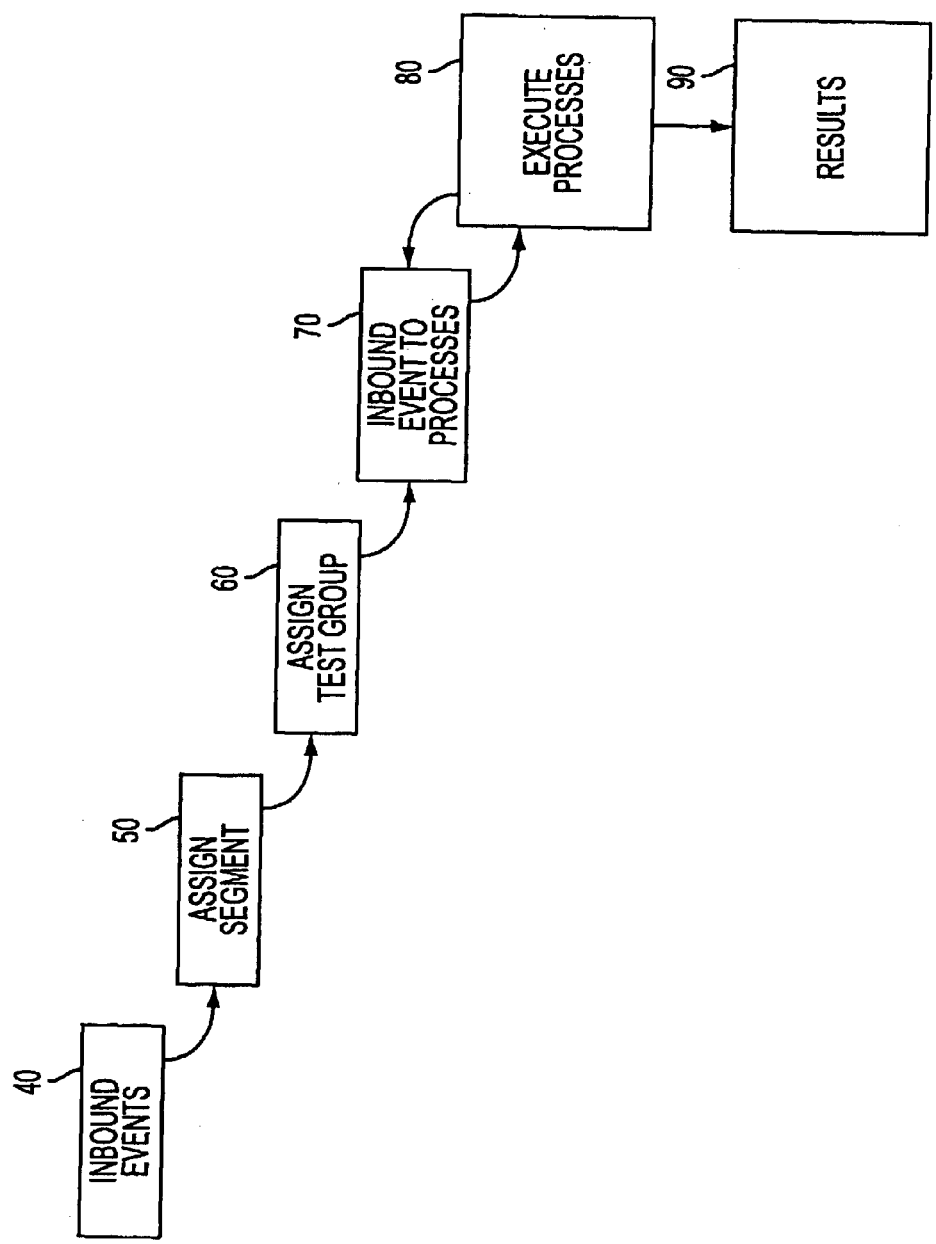
FIG. 2 (prior art) is a more detailed diagram illustrating the operation of a decision management system.
Figure 3:
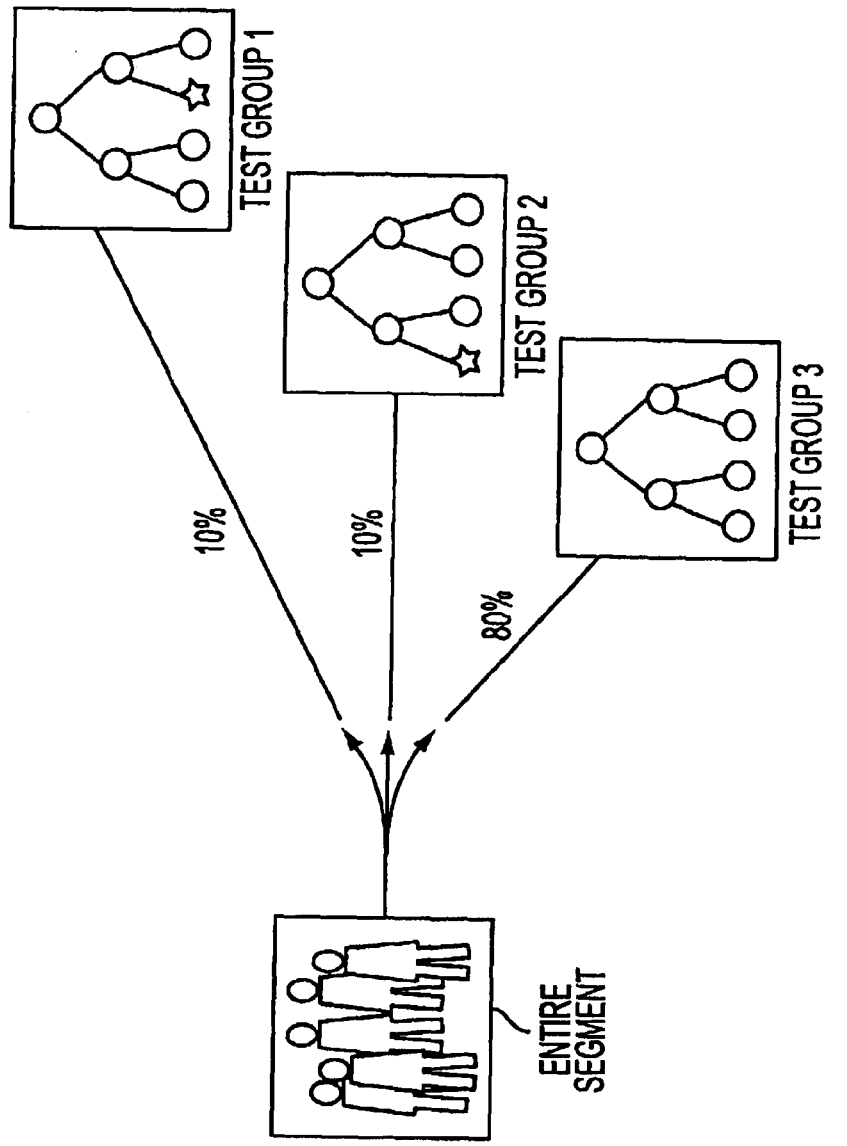
FIG. 3 (prior art) is a diagram illustrating an example of a segment being divided into different test groups in a decision management system.
Figure 4B:
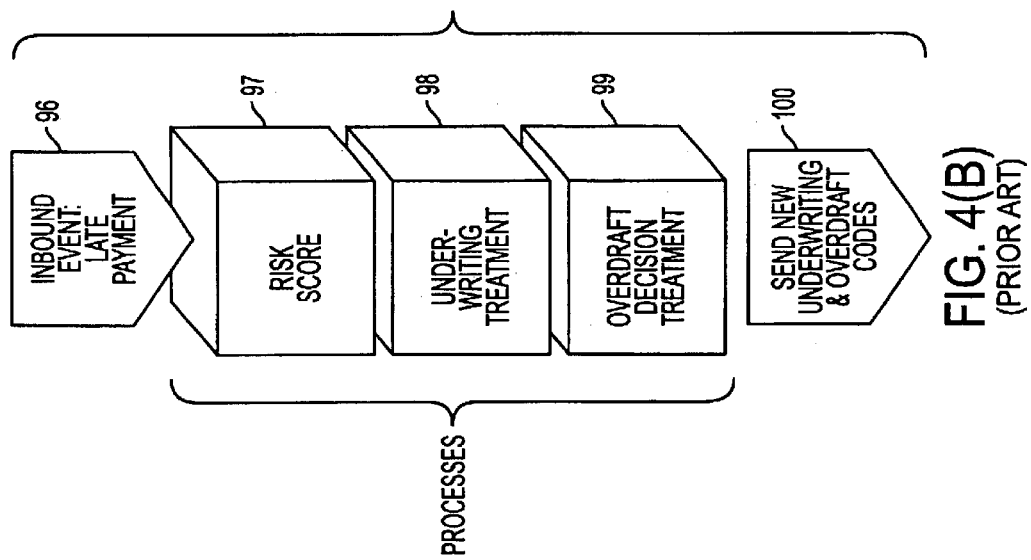
FIGS. 4(A) and 4(B) (prior art) are diagrams illustrating the matching of inbound events to processes in a decision management system.
Figure 4A:
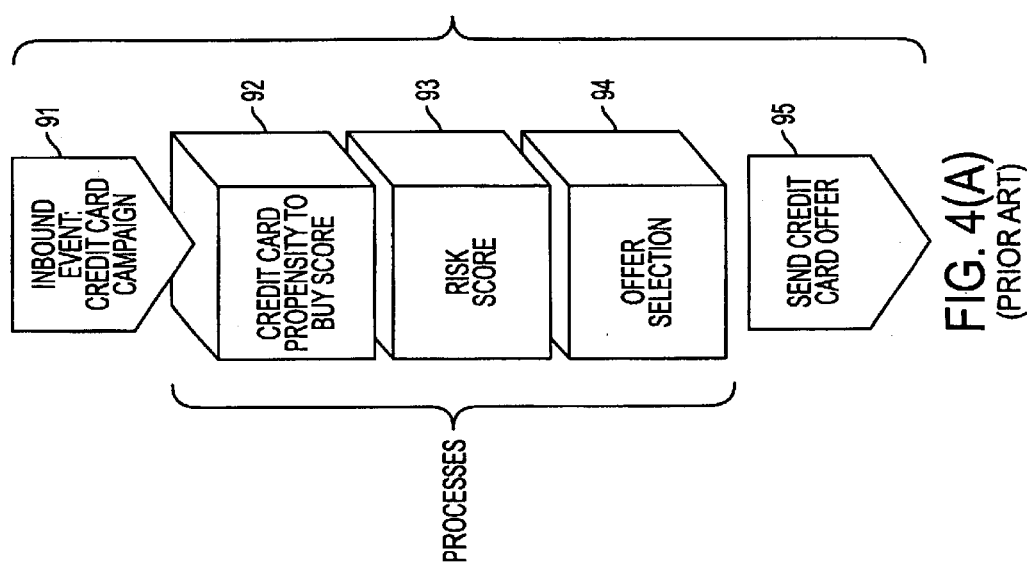

From step 165 the system moves to step 170, where inbound events are matched to function sets. Here, a function set has a similar meaning as a "process" described, for example, in FIGS. 4(A) and 4(B), but the present invention uses a different terminology.

From step 170, the system moves to step 180, where the specific function sets for one or more specific inbound events are executed.

From step 180, the system moves to step 190, where the results, or action items, are output.

FIG. 9 is a diagram illustrating the creation of a matrix of the categories and test groups for a respective segment, as in step 165 of FIG. 8, according to an embodiment of the present invention. Referring now to FIG. 9, categories of, for example, Bronze, Gold and Platinum are on one axis of the matrix, and test groups 1, 2 and 3 are on the other axis of the matrix. The intersection of a respective category with a respective test group represents a strategy test cell of the matrix.

Then, possibly for each function set, different strategies are designed for different strategy test cells of the matrix.

Figure 5:
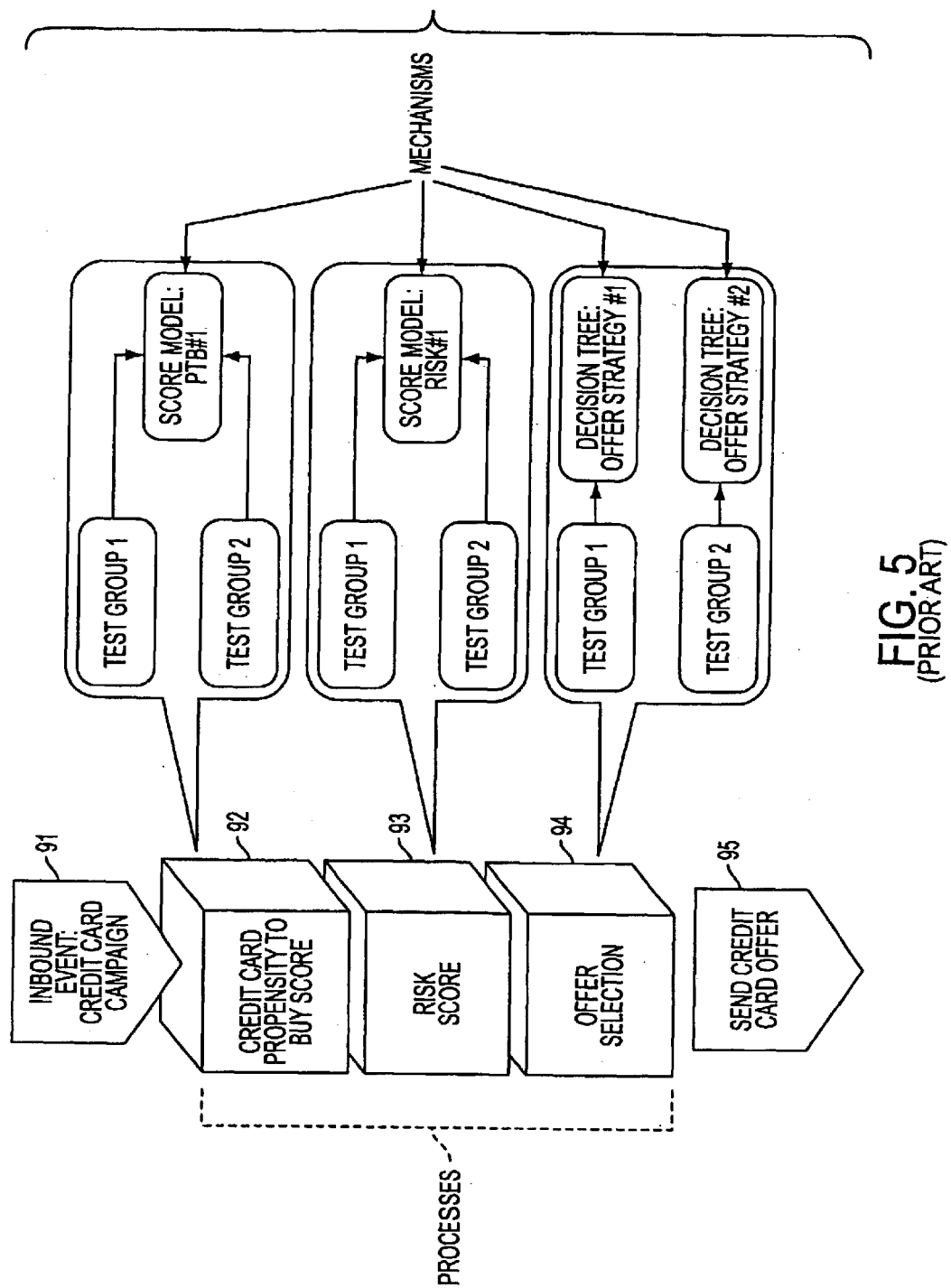
FIG. 5 (prior art) is a diagram illustrating the grouping of mechanisms to processes in a decision management system.
Figure 6:
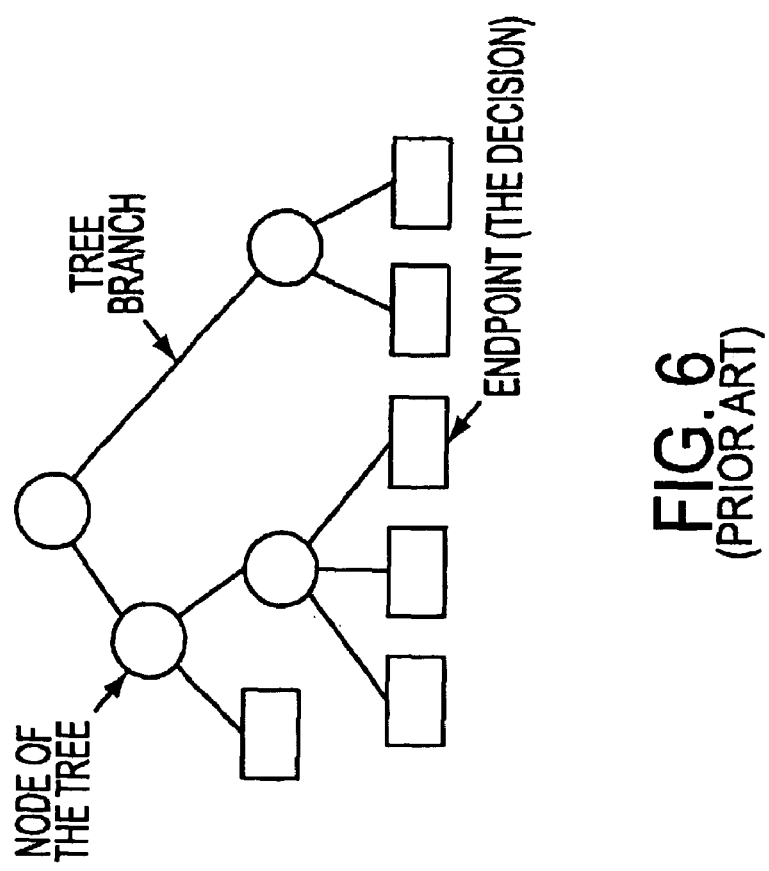
FIG. 6 (prior art) is a diagram illustrating a decision tree.

A function set is formed by one or more functions, where a function can be, for example, a decision tree, a score model, a matrix, a user exit or a list processor. Here, a function has a similar meaning as a "mechanism" described, for example, in FIG. 5, but the present invention uses a different terminology and provides the ability to store each result independently. Moreover, in the conventional system of FIG. 5, user exits and list processors were not available as mechanisms. Thus, generally, the correlation of function sets to functions is similar to that for processes to mechanisms in FIG. 5, but the terminology is different.

Figure 10:
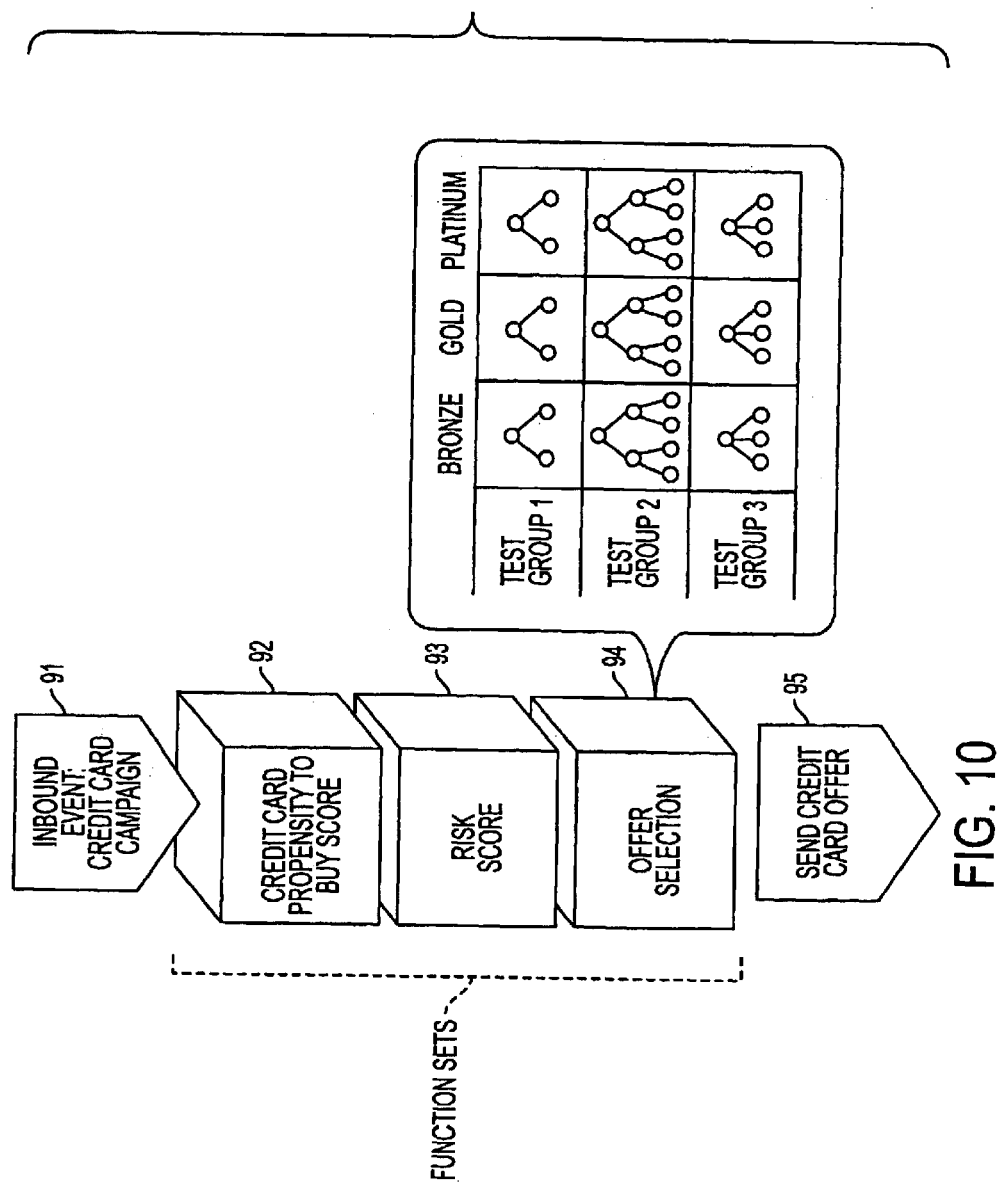
FIG. 10 is a diagram illustrating the correspondence of functions of a respective function set to strategy test cells of a matrix, according to an embodiment of the present invention.

FIG. 10 is a diagram illustrating an example of the correspondence of functions of a respective function set to the strategy test cells of the matrix, according to an embodiment of the present invention. Referring now to FIG. 10, various function sets, including credit card propensity to buy score 92, risk score 93 and offer selection 94, are executed in a user-defined order upon the occurrence of inbound event 91. Offer selection 94 includes a respective function, which is possibly a decision tree, for each strategy test cell.

When function sets are executed in step 180 of FIG. 8, preferably the results of each function set are stored independently for use in later executed function sets. For example, in FIG. 10, a score computed by the credit card propensity to buy score function set 92 is stored independently. Similarly, a risk score computed by the risk score function set 93 is stored independently. Then, the offer selection function set 94 can use both stored scores to compute an offer selection.

Such independent storing of results is easily accomplished by allowing the system analyst to define variables for storing results of functions used in the function sets. For example, the system analyst can define a variable in which the results of the risk score function set 93 are to be stored. This variable can be labeled, for example, as "risk score". One or more variables can be designed for each function set.

Such independent storing of results is significantly different from a conventional decision management system. More specifically, in a conventional decision management system illustrated in FIGS. 1–7, only a single set of variables was defined by a system analyst. This single set of variables was written over and used for each function set. Subsequent function sets wrote over the data stored in the variables from the previous function sets. For example, referring to FIG. 4, once a risk score was computed by risk score 93, this risk score was stored in a variable which may have stored a score computed by credit card propensity to buy score 92. Thus, the results of the processes were not independently stored, and were written over each other into the same set of variables. In this manner, the conventional decision management system had a forced dependency between processes.

Preferably, the structure of the decision tree is the same for a respective test group across each category. For example, in FIG. 10, the tree structure in the strategy test cells for test group 1 are the same for each of the Bronze, Gold and Platinum categories. Of course, the actual decisions made at each node and the branching criteria can be different. Similarly, the tree structure in the strategy test cells for test group 2 are the same for each of the Bronze, Gold and Platinum categories. This allows comparison across categories. This same principle holds across test groups for a given category.

Further, it is not necessary for a function set to have a different function for each strategy test cell. Some, or even all, of the strategy test cells for a respective function set can have the same function, depending on the level of testing which is desired to be performed. The specific design of the functions of a respective function set as they correlate to strategy test cells is a matter of design choice, thereby allowing greater flexibility in configuration of the system.

As a strategy is designed, the strategy test cells will be examined against each other. Preferably, there is a common set of metrics for the entire matrix, where the metrics are the appropriate measurements against which to measure the performance of the strategy defined for a segment. Then, for example, it can be determined how well a test group is shifting customers to other categories. For example, it can be determined how quickly test group 1 is moving Bronze customers into the Platinum category in the matrix of FIG. 9.

Although it is preferable to create a data structure which is in "matrix" form for analyzing the movement of clients, the present invention is not intended to be limited to the use of a "matrix." Instead, any data structure which is equivalent to a matrix in providing the required functionality for defining strategy and analyzing the movement of clients will be appropriate. Therefore, generally, many different types of data structures providing an intersection between categories and test groups can be used.

As described above, once clients are placed into categories, the strategy test cells in the matrix are used to design experiments. For example, for the Bronze category, a series of experiments can be designed for each strategy test cell in that category.

In addition, as will be described in more detail below, the decision management system can measure performance so that the overall strategy can be appropriately adjusted to optimize results.

FIGS. 8–10 represent the logical flow of how strategy test cells are created, or assigned. However, the systematic or technical flow may be different. For example, the loop between steps 180 and 170 in FIG. 8 typically executes several function sets. Preferably, all non-test group specific function sets are executed first. These typically include the assessment/execution of predictive algorithms and models. Subsequently, a categorization function set can be executed, to categorize the clients. The categorization function set is generally not test group specific, and often uses the information derived from the function sets that have already been executed. Thereafter, a test cell assignment function set may be executed, to assign clients to specific test cells, or the system user (such as a system analyst) may simply do this implicitly through the definition of rules.

Figure 11:
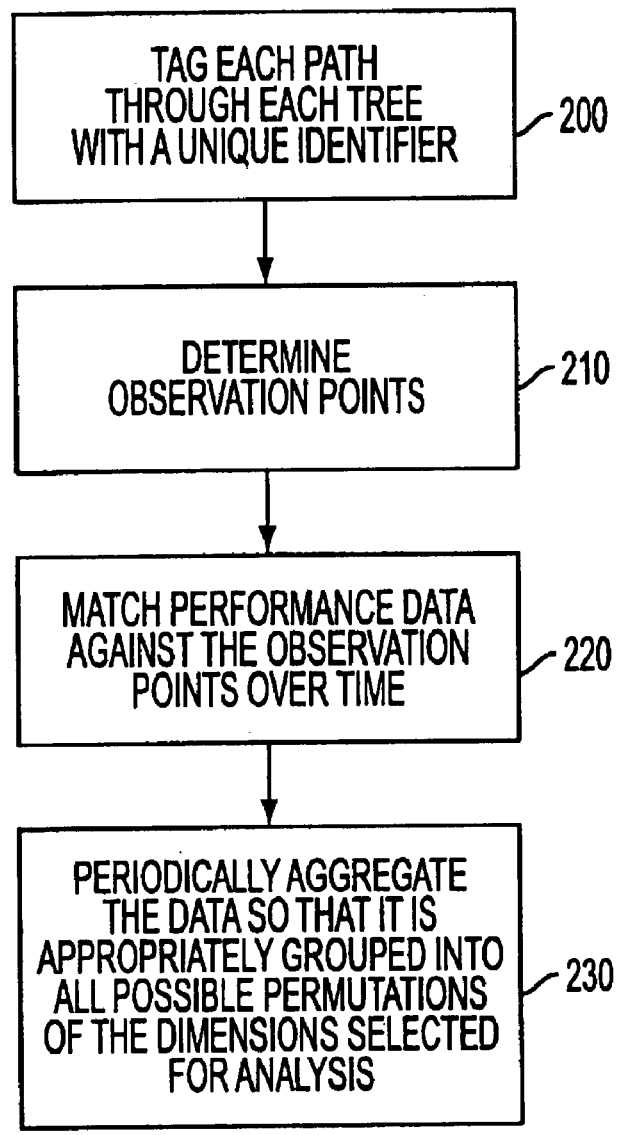
FIG. 11 is a diagram illustrating a data aggregation operation of a decision management system, according to an embodiment of the present invention.

FIG. 11 is a diagram illustrating a data aggregation operation of a decision management system, to support the use of online analytical processing (OLAP) technology, according to an embodiment of the present invention. More specifically, the data aggregation operation of FIG. 11 prepares and correlates data, translating it into a data model, to support the use of OLAP technology.

Referring now to FIG. 11, in step 200, each path through each decision tree is tagged with a unique identifier referred to as a report group. Although it is preferable to tag each path through each tree so that complex strategy can be created and refined, it is not necessary for each path to be tagged. Instead, the selection of which paths to tag is a matter of design choice, based on the strategy parameters of the decision management system.

A report group is a tag which identifies a unique path through a policy, strategy or set of rules, and is preferably, although not necessarily, applied to terminal nodes of decision trees. A report group is preferably independent of the test group, so that it can be associated with the same branch of comparable trees in two or more test groups. Report groups are a valuable strategy evolution tool, and enable comparative evaluation of strategy effectiveness for categories within a segment. Categories allow for the analysis of clients who, once being individually evaluated against user-defined criteria, are determined to have similar qualities in consideration of organizational objectives. For example, a category may be defined as all customers who have average current value, high potential value, and a low probability of attrition. Report groups can be placed throughout a decision strategy in order to assure that performance results are accumulated for each respective part of the strategy. The concept of tagging a path to measure performance, as with a report group, is known.

All clients in a given report group should be relatively homogenous, the difference being the test group to which they were randomly assigned and thus the action/decision applied to them based on their test group. Since report groups are independent of test groups, they allow for comparison of the same or alternate categories across experiments (i.e., comparison within the category Platinum of a report group for the test 1 and control test groups). Decision effectiveness reports can then track specified performance metrics (i.e., response rate for marketing, approval rate for underwriting, etc.) by test group for each report group.

A decision management system according to the embodiments of the present invention collectively uses test groups, report groups, categories and user-defined, multi-dimensional decision effectiveness reports to quickly determine the most effective strategy for each segment within a client portfolio.

Referring again to FIG. 11, from step 200 the system moves to step 210, where observation points are determined. More specifically, each time a decision is made about a client, that decision is posted. More importantly, the report group that the client passed through is posted. In addition, what segment, category, test group, etc. is posted. This is referred to as an observation point. An observation point is not intended to be limited to posting any specific criteria, so that a strategy analyst has flexibility in determining what data should be posted. Similarly, an observation point is not limited to only be triggered by a decision. For example, a score model or matrix invocation could trigger an observation point.

From step 210, the system moves to step 220, where performance over time for observation points is accumulated, and matched against the observation points. Generally, an observation point is a snapshot of a point in time, and has dimensions across which analysis of the data can be performed. A specific client can have multiple observation points. Therefore, in step 210 in FIG. 11, observation points for a client are noted. Then, in step 220, for each client, performance data is matched against observation points. For example, once a month, performance data for a client may be obtained. This performance data is then matched, or correlated, to the appropriate observation points for each account and/or customer.

For example, on Jan. 1, 1998, assume that a decision is made to increase a client's credit limit by $500. This information is stored as an observation point. Data stored as part of the observation point's dimensions may be, for example, client ID, what segment the client was in, what category the client was in, what test group the client was in and what report group the client was in when that decision was made.

On Jan. 31, 1998, Feb. 31, 1998, Mar. 31, 1998, etc., some additional performance data may be obtained. For example, how much of the credit line increase was used? Did the client go delinquent on the account? What was the current value of the customer? What was his/her profitability? For example, over the course of a year, twelve (12) sets of performance data may be obtained for this client, each including all of these performance metrics.

Over the course of the year, other decisions may be made. For example, a mortgage offer may have been made to the client. This mortgage offer would represent a new observation point. From this time on, performance data would be accumulated for that observation point. In January, 1999, observation points made in January 1998, can possibly be rolled off, depending on the user's desired parameters dictating how long performance is to be retained. Therefore, for example, the performance of the January, 1998, credit line increase decision has been tracked for twelve months, but it will not be tracked anymore. However, performance data will still be accumulated for the observation point where the mortgage offer was made. How long to accumulate and maintain performance data for a specific observation point is a matter of design choice. Common performance data may be captured once for multiple observations.

From step 220, the system moves to step 230, where the collected performance data is periodically aggregated and grouped, preferably, into all possible permutations of the dimensions noted when the observation point was taken and selected for analysis. Generally, in step 230, it is not desirable to report on a specific client, but how well a specific test group or strategy performs. For example, the data is preferably aggregated to determine the performance of segment 1, test group 4, bronze customers, report group B. An aggregate performance data measure can then be determined for all clients meeting this criteria. In this manner, it can be evaluated how well a certain test group or category performed, instead of how well a specific client performed. Thus, strategy performance can be evaluated, instead of individual client performance.

As a result of the aggregation of data, a row of data having two parts, dimensions and metrics, can be created. Dimensions are the ways the organization wants to view the performance results. For example, segment and category would be dimensions. Aggregating the data in a row allows us to view the intersection of the different points in the matrix created in step 165 of FIG. 8. For example, by aggregating the data, we can view all the metrics, or results, associated with Bronze, test group 2. The user can interactively select which dimensions to apply in filtering the results.

Therefore, the dimensions of the rows should preferably provide all the different ways in which it is intended to analyze the performance data. The dimensions would likely include combinations that allow data relating to the category assignment matrix to be viewed, and combinations that allow data relating to specific strategy paths to be viewed.

For example, a row might include the dimensions of segment, test group, category and report group. The metrics for that row should include data relating to those dimensions, such as, for example, delinquency, % credit line used, value, profit. Therefore, by storing dimensions as a "key" to the data, a "solution set" of metrics is obtained which matches that key.

Each row can be thought of as being a unique intersection of values for all dimensional columns. Preferably, the metrics associated with dimensions are appropriately aggregated for every possible permutation of all of the dimensions. For example, one row can include the dimensions of segment 1, test group 1, category 1, report group 1, and the aggregate results that meet these dimensions. The next row may include the dimensions of segment 1, category 1, test group 1, report group 2, and the aggregate results that meet these dimensions.

When performing the data aggregation operation, all possible permutations of dimensions are preferably determined. Then, the results of clients meeting these dimensions should be matched to these permutations.

For example, FIG. 12 is a diagram illustrating an example of a row of data having a dimensions part and metrics part, according to an embodiment of the present invention. Referring now to FIG. 12, each row includes the dimensions of observation time, performance time, segment, test group, category and report group. Preferably, a row is created for each possible permutation of the dimensions. The metrics of delinquency, % credit line used, value and profit are then matched to the various permutations of the dimensions. Generally, the metrics for a specific row should indicate the consolidation all the individual client data of all the individual clients meeting the values of the dimensions identifying that row. Therefore, the data for each specific client is not being reviewed, but instead the performance of a specific strategy is being reviewed.

Thus, the rows of data can be considered to be a data structure which is accessed to track the performance of a category or dimension.

The use of time dimensions, such as the dimensions of observation time and performance time, allows the movement between categories to be examined over time. Additionally, time allows for trend analysis and selective inclusion of performance points to assess when a strategy was performed well/poorly.

Preferably, relational tables, such as, for example, look-up tables, are used for each of the dimensions, to appropriately and descriptively access the data, and to allow a system user to easily change strategy/aggregation parameters which are subsequently reflected in the tables.

For example, FIG. 13 is a diagram illustrating a look-up table for the test group dimension in the row illustrated in FIG. 12, according to an embodiment of the present invention. Referring now to FIG. 13, the look-up table includes a date column (DATE), a test group identifier column (TEST), and a description column (DESCRIPTION). A look-up table could be created for each of the dimensions of the row illustrated in FIG. 12. Moreover, a system user can define T1, T2, T3, . . . , and can add and delete tests as desired. Such changes can be made, for example, through a simple user interface, such as a graphical user interface. Thus, the present invention supports the ability to change values of the dimensions instantly and in response to user changes in strategy or policy.

Once the data is aggregated by the operation in FIG. 11, the data is preferably analyzed via well-known online analytical processing (OLAP) techniques and technology. Therefore, the aggregated data can be used to determine the effectiveness of various strategies. For example, in the above-described manner, various strategies can be tested to determine whether the strategies are successful in moving clients to more desirable categories.

Aggregate comparisons of test and control strategies can mask important differences in strategy effectiveness. For example, two strategies may appear equally effective in terms of aggregate performance while they actual outperform each other for different segments of the client portfolio. This is most easily explained by way of the hybrid approach illustrated in FIG. 7.

Figure 7:
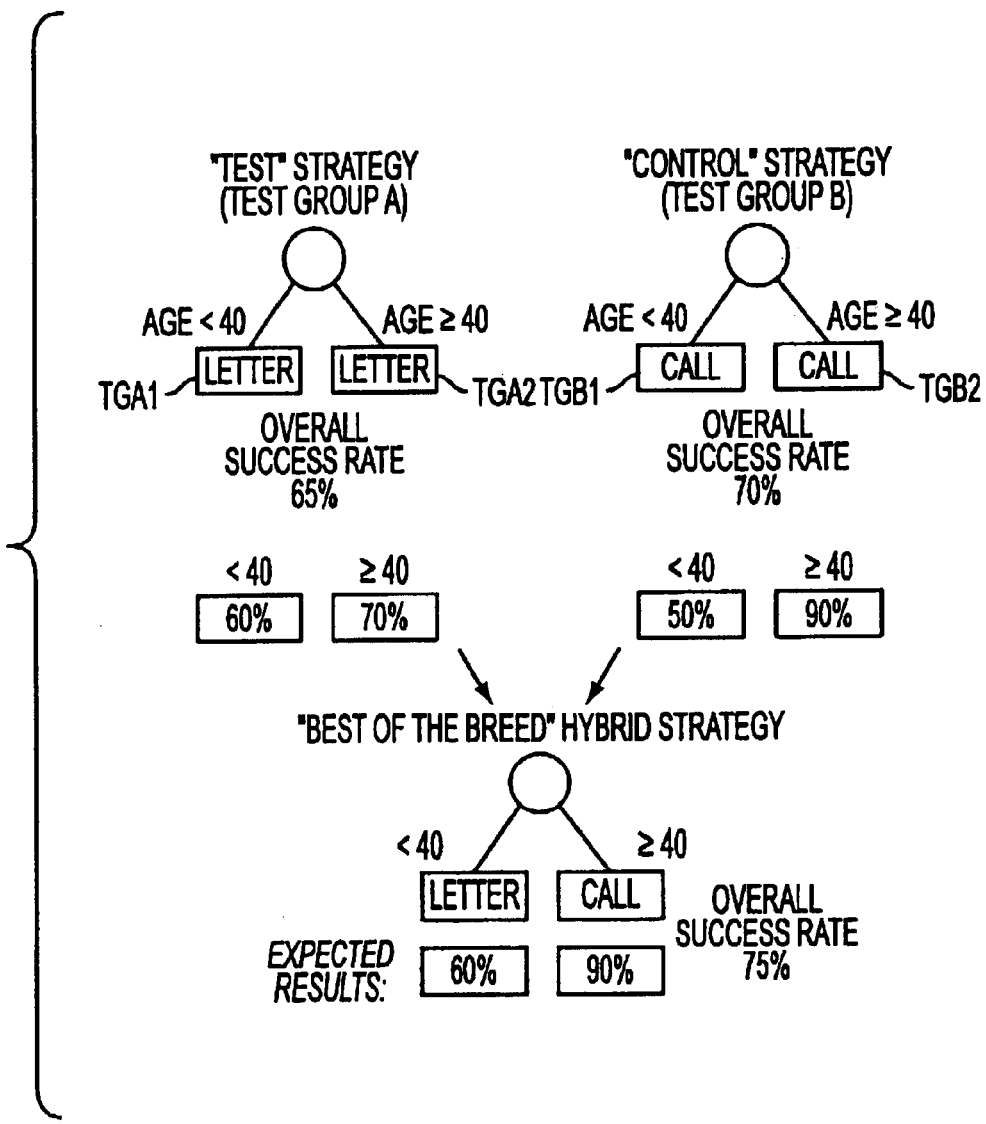
FIG. 7 (prior art) is a diagram illustrating a hybrid strategy in a decision management system.

Referring now to FIG. 7, an overall comparison of the results for the test strategy versus control strategy would indicate that the control strategy was superior (as measured by overall success rate). However, when strategy effectiveness is reported at the further segmented report group level (i.e., for each comparable path through test groups), it is possible to build a new hybrid strategy that will outperform either test or control by combining the best performing actions of each strategy.

In creating the infrastructure to create hybrid strategies, decision trees should preferably have the same structure for each test group, but could have different actions or decisions associated with each node. Then, a report group, because the tree structures are identical, can allow two or more identical paths to be associated with each other, independent of the test group. For example, instead of simply comparing the overall performance of test group 1 to test group 2, the same path in test group 1 can be compared to the same path in test group 2. This allows microanalysis of the strategy test cells, to determine which paths are performing very well or very poorly.

According to the above embodiments of the present invention, clients can be randomly assigned to a test group. Each test group has associated with it one or more strategies typically defined using decision trees. Each possible path through a decision tree can be "tagged" and the performance of all clients that went down that path can be monitored.

Report groups and categories can be considered to be different types of "tags." Report groups are preferable to tag paths in a single function set and provide measurement of just that path across all test groups/trees used in the respective function set. Categories provide similar functionality as report groups, but at an aggregate level. More specifically, the performance of a category is tracked as the cumulative performance of report groups assigned in strategy paths that were traversed after the assignment of the category.

Report groups define unique paths through a strategy and span test groups such that performance of path A in test group 1 can be compared with path A in test group 2. The rules associated with a given path should preferably be the same across two test groups, but the decisions assigned at the end of the path may vary by test group. As a result, the strategy experimentation function can be accelerated by not simply comparing two or more test groups to determine the best performer, but rather by measuring individual paths across two or more test groups such that a new hybrid strategy can be developed using the best performing paths of each test group.

As an example, assume that the following function sets will be executed in order: CATEGORY ASSIGNMENT, APPROVE/DECLINE DECISION, and CREDIT LIMIT ASSIGNMENT. In CATEGORY ASSIGNMENT, there are three paths used to segment customers into three categories: HIGH RISK, MEDIUM RISK and LOW RISK. Two test groups are then defined: TRADITIONAL (70%) and AGGRESSIVE (30%). The CATEGORY ASSIGNMENT tree is the same for both test groups since categories span test groups and vice-versa (i.e., a many to many relationship). However, the trees associated with the APPROVE/DECLINE and CREDIT LIMIT ASSIGNMENT function sets will have different decisions, depending on the test group.

For APPROVE/DECLINE, there are three paths through the decision tree, defined by report groups A, B and C. Similarly, there are three paths through the decision tree for CREDIT LIMIT ASSIGNMENT, defined by report groups D, E and F.

FIGS. 14(A), 14(B), 14(C) and 14(D) are diagrams illustrating the operation of a decision management system as applied to CREDIT LINE ASSIGNMENT, according to an embodiment of the present invention.

Referring now to FIGS. 14(A) and 14(B), as described above, 70% of customers are assigned to the test group TRADITIONAL, and 30% of customers are assigned to the test group AGGRESSIVE. Each test group has the same decision tree structure. There are three paths through the decision tree for CREDIT LIMIT ASSIGNMENT, defined by report groups D, E and F.

A decision management system according to the embodiment of the present invention provides the ability to measure the performance of each report group across test groups. For example, while at an aggregate level, assume that TRADITIONAL produced more profit than AGGRESSIVE. However, assume that the path/decision associated with report groups D and F in AGGRESSIVE generated more profit than the same path/decisions associated with report groups D and F in TRADITIONAL, as indicated by the "check mark" in FIG. 14(B) next to report groups D and F.

However, assume that report group E in TRADITIONAL was more profitable than the comparable paths/decision in AGGRESSIVE, as indicated by the "check mark" in FIG. 14(A) next to report group E. Rather than simply increasing the percentage of people assigned to TRADITIONAL, a new hybrid strategy can be defined and associated with a test group that uses the decision assigned for report groups D and F in AGGRESSIVE in conjunction with the decision assigned to report group E in TRADITIONAL. This new test group will be called, for example, TRADITIONAL_2. The overall profitability of TRADITIONAL_2 will be higher than either TRADITIONAL and AGGRESSIVE since it contains the best performing paths/decisions of each test group for the CREDIT LINE ASSIGNMENT function set. A similar procedure would be performed within APPROVE/DECLINE using report groups A, B and C, to develop an improved hybrid strategy for APPROVE/DECLINE.

To continue the example and relate it to categories, the performance of TRADITIONAL can be examined over time in moving more people into the LOW RISK category from the HIGH RISK category. This can be compared to the effectiveness of AGGRESSIVE at achieving the same objective (i.e., over time, moving more people into the LOW RISK category).

For example, FIGS. 14(C) and 14(D) each represent a matrix having the categories of HIGH RISK, MEDIUM RISK and LOW RISK on one axis, and the test groups TRADITIONAL and AGGRESSIVE on the other axis. Thus, these matrices have the same axes and values on the axes as the matrix in step 165 of FIG. 8. However, the matrix in step 165 in FIG. 8 is used to allocate customers to strategy test cells, whereas the matrix in FIGS. 14(C) and 14(D) are used to leverage performance metrics for each strategy test cell. More specifically, the matrices in FIGS. 14(C) and 14(D) are for viewing the movement of clients between categories. By contrast, the matrix in step 165 of FIG. 8 is for actual strategy execution versus strategy reporting.

As an example, assume that FIG. 14(C) represents a matrix based on data for January 1997, while FIG. 14(D) represents a matrix based on data for December 1997. As can be seen from comparing FIGS. 14(C) and 14(D), both test groups were effective in moving customers from the HIGH RISK category into the MEDIUM RISK and LOW RISK categories. Therefore, the company might consider permanently implementing these test group strategies. Moreover, hybrid strategies can be developed from test groups in the same category and possibly across categories. In this manner, strategies can be tested and implemented to move customers appropriately into different categories.

The effectiveness measurement of the categories is a direct function of aggregating the performance associated with the report groups assigned to the clients for the APPROVE DECLINE and/or CREDIT LIMIT ASSIGNMENT function sets.

The various processes, procedures, methods and operations described herein are preferably embodied in software, which can be run on many different hardware configurations.

Figure 15:
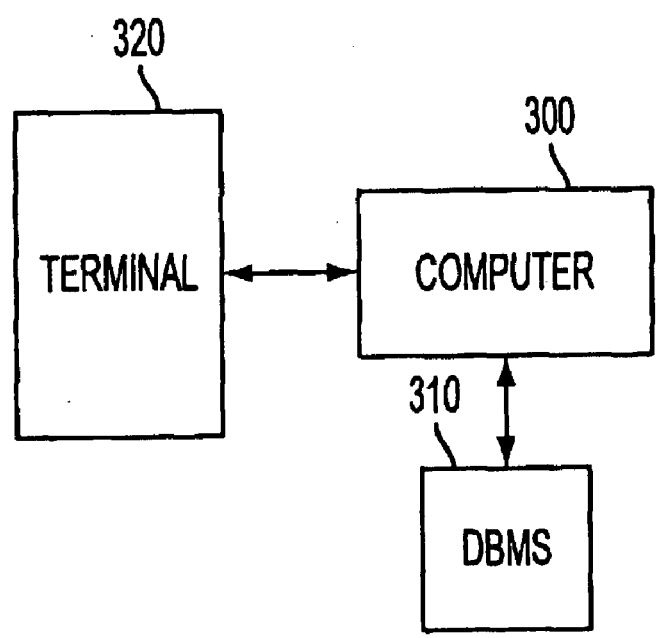
FIG. 15 is a diagram illustrating a simplified hardware architecture of a decision management system, according to an embodiment of the present invention.

FIG. 15 is a diagram illustrating a simplified hardware architecture of a decision management system, according to an embodiment of the present invention. Referring now to FIG. 15, the decision management system is embodied in software stored in a computer-readable medium, such as a memory of a computer 300. Computer 300 can be, for example, a server and associated memory. Computer 300 preferably has access to a data base management system (DBMS) 310 for storing and accessing accumulated data. A system user, such as a system analyst, accesses computer 300 possibly via a terminal 320 which can be, for example, a PC. There are many different types of hardware configurations, including many different types of client/server architectures, which can be used. Such hardware configurations would be understood by a person of skill in the art.

Figure 16:
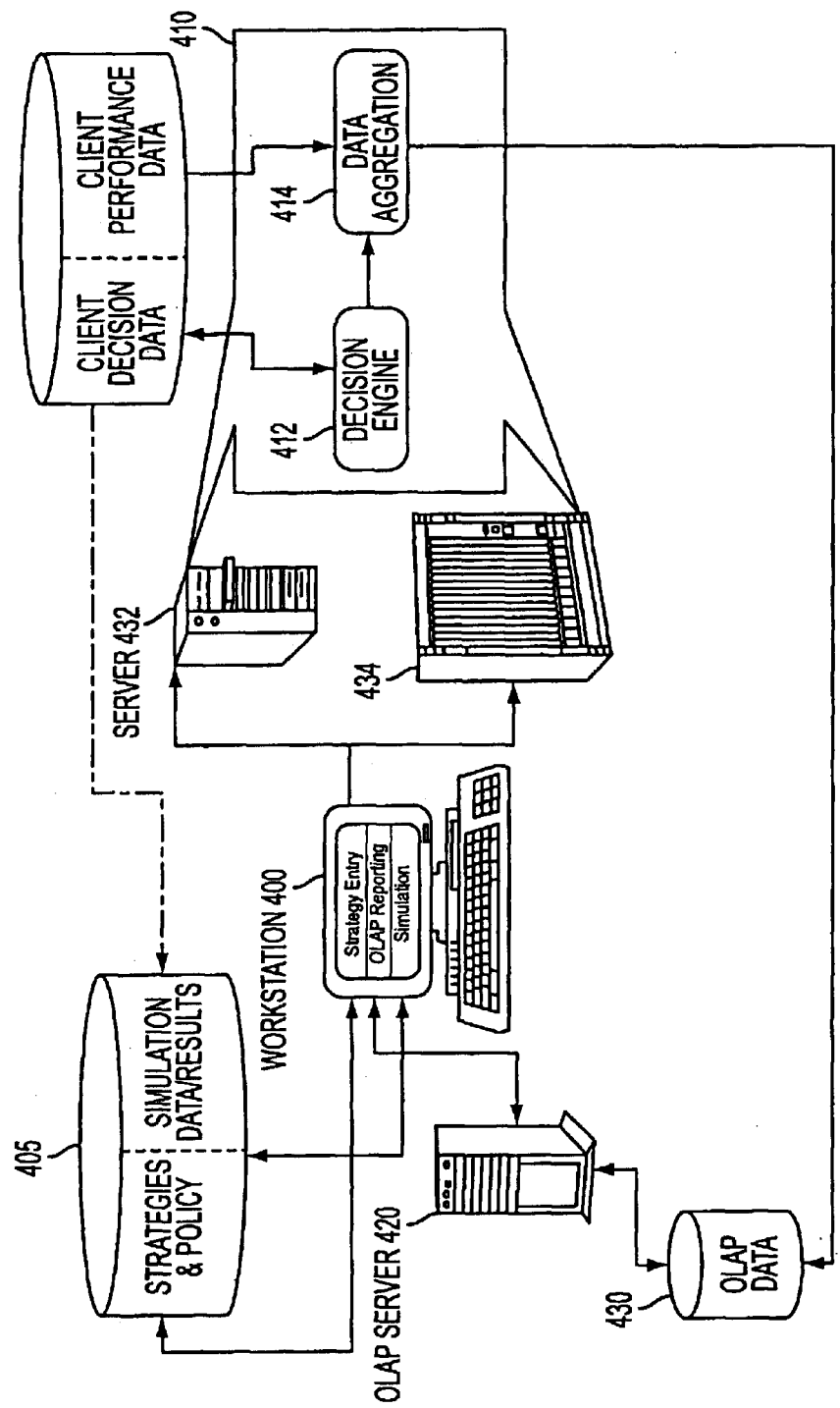
FIG. 16 is a diagram illustrating a more detailed hardware architecture of a decision management system, including the distribution of software, according to an embodiment of the present invention.

FIG. 16 is a diagram illustrating a more detailed hardware architecture of a decision management system, according to an embodiment of the present invention. Referring now to FIG. 16, a workstation 400 provides a centralized user interface through which a strategy analyst can control the system. The primary purpose of workstation 400 is to enable the entry, maintenance and propagation of decision strategies to a decision engine/data aggregation platform 410 which includes a decision engine 412 and a data aggregation component 414. Workstation 400 also provides access to OLAP analysis and reporting systems, possibly via an OLAP server 420, and using an OLAP database 430. A server 432 and a mainframe 434 typically run different processing modes, and provide the processing power for decision engine/data aggregation platform 410.

Workstation 400 allows a strategy analyst to enter information, such as various rules for creating a strategy, via a graphical user interface (GUI). This information is then stored in tables of a relational data model. Decision engine 412 deploys the business decisioning rules entered on workstation 400 against client data. Thus, decision engine 412 obtains the rules from the tables created on workstation 400 by a system analyst. In this manner, the rules deployed by decision engine 412 can easily be changed by a system analyst, and are not fixed or limited in any industry specific manner. Decision engine 412 is therefore the execution component of the system, as decision engine 412 takes the rules input by a system analyst, and computes the results using customer/account data.

The architecture in FIG. 16 is highly scaleable and can operate in both on-request or batch processing modes as well as on both mainframe and client/server platforms.

Potentially sharing the same platform and processing modes as decision engine 412 is data aggregation component 414. Data aggregation component 414 is responsible for matching/merging decision engine output (i.e., scores and decisions stored as observation points/data) with the results of enacting recommendations (i.e., account behavior or performance) of decision engine 412. Data aggregation component 414 provides the information that OLAP server 420 accesses to review strategy performance.

The OLAP portion of the system preferably uses a one to four tier architecture to allow a strategy analyst to do multidimensional analysis on the results of deployed strategies. The OLAP portion of the system can be extremely scaleable through leveraging the following configurations: data resides locally with a graphical reporting user interface (1 tier), data resides independently from the graphical reporting user interface (2 tiers), a server resides between the user interface and the data to expedite query requests and monitor strategy results (3 tiers) and/or a web server resides between the user interface and the OLAP server to enable mass browser-based distribution of reports (4 tiers). OLAP's multidimensional qualities provides analysts with the flexibility to "mine" their results, examining relationships in the data as well as the ability to perform ad hoc calculations and re-format views as required.

There are several different processing modes of the decision management system. These processing modes include, for example, (1) a simulation processing mode on Windows NT, Windows 95 and/or Windows NT; (2) a mainframe batch processing mode, where, for example, multiple accounts are batch processed without a system waiting in a suspended state pending the results; (3) a mainframe online processing mode where, generally, there is an instantaneous response for one customer at a time to a waiting system; and (4) a client-server processing mode with a distributed environment. Each of these modes is a well-known mode.

Further, there are several different platforms on which the processing modes can run. These platforms include, for example, (1) an IBM mainframe or compatible platform; (2) a Windows 95, a Windows 98 and/or a Windows NT platform, and (3) a Unix platform. Each of these platforms is well-known. Generally, for example, the IBM mainframe or compatible platform supports the mainframe batch processing mode and the mainframe online processing mode. Generally, for example, the Windows NT platform supports the simulation processing mode. Generally, for example, the Windows NT and Unix platform supports the client-server processing mode. However, the present invention is not intended to be limited to these specific examples of processing modes or these specific platforms. Instead, there are many possible processing modes, many possible platforms, and many possible combinations of processing modes running on platforms.

The decision management system runs cross-platform since, as illustrated in FIG. 16, the decision management system runs simultaneously across many hardware platforms with many different processing modes. For example, in FIG. 16, workstation 400 would typically perform the simulation processing mode on Windows NT/95/98, and mainframe 434 might perform on-request/batch processing. Server 432 might also perform on-request/batch processing on Unix and/or Windows NT/95/98.

As indicated above, workstation 400 allows a strategy analyst to enter information via a graphical user interface (GUI), or any other type of user interface. Such information would include, for example, various rules to be applied. Such rules are, for example, the decision trees of function sets. For example, the configuration and data required to design an appropriate decision tree is input by the system analyst via a GUI on workstation 400. Therefore, the strategy analyst can enter and maintain the rules via a GUI on workstation 400.

No labels or particular syntax is required in the GUI that ties the decision management system to a specific function or industry. Therefore, the decision management system is not limited74Xuse in any specific industry or any specific function. For example, when entering the rules for a function set, the system analyst can provide the function set with any label, and can design the function set with any desired rules. For example, a function set can be labeled Collections or Risk Score, depending on how the system analyst intends to use the decision management system. Moreover, for example, a decision tree is not limited to any particular structure for the function set, and the structure can be determined by the system analyst.

Moreover, through the GUI, the data coming in to and out of the decision management system is parameter driven. More specifically, the system analyst can define the format, structure, content, source (if the data is coming in to the system) or target (if the data is coming out of the system). For example, the system analyst can define the format of data so that the decision management system can be used with any source system, or the data can be passed to any target system. Thus, the flow of data in/out of decision engine 412 is controlled by parameters set by the system analyst via a GUI, and is not hard coded.

For example, the GUI would typically store in relational tables both the data elements being sent in/out of the system, and the sequence of the data elements. For example, balance data may reside within the data structure at a location preceding or following credit limit data. This sequence represents the sequence of the incoming data to decision engine 412. This sequence can be set by the system analyst via a GUI, instead of being hard coded into the system. For example, a data layout may be 4000 characters. A system analyst can define the actual positioning of the data, such as defining that the balance starts at position 200 and has a length of 10. As a result, decision engine 412 can create a data map based on the parameters entered by a system analyst via a GUI. Similarly, changes in the data structure/format do not require coding changes in the decision management system.

Offsets are typically used to identify the position of incoming data because incoming data is often randomly referenced. Offsets allow the system to go right to a specific location (for example, position 200) to get the data.

Outgoing data is typically referenced ordinally (that is, in a certain order). For example, decision engine 412 puts the first piece of data in the first location (for example, position 1, length 10), and puts the next piece of data in the next location (for example, position 11, length 5). Thus, the outgoing data is not randomly placed, but is placed in order, based on the expectations of the system receiving the data. Therefore, the system analyst defines the layout of the outgoing data via the GUI, and decision engine 412 uses these definitions to create the outgoing data stream. Similarly, via the GUI, the system analyst can define the data flow between decision engine 412 and data aggregation component 414. Data aggregation component 414 is used in a reporting infrastructure. Thus, the use of a GUI allows the format of outgoing data, and the format of data flowing between decision engine 414 and data aggregation component 414, to be set or changed by a system analyst without technical intervention. That is, there is no need for a programmer to actually change the written software code to change the format of the data. This is extremely advantageous, since, based on the industry and the required operation, the format of the data transferred between decision engine 412 and data aggregation component 414, or the data output from the decision management system to an external system, will change.

Moreover, by entering data in workstation 400 via a GUI, function sets can be flexibly defined by a system analyst both in terms of content and sequence. For example, regarding content, the strategy within a respective function set can be tailored to a specific objective, such as risk score, offer selection, or propensity to buy score, as illustrated in FIG. 10. Regarding sequence, the system analyst can flexibly define the sequence of execution of function sets, such as in step 170 of FIG. 8. The data creating a strategy, such as the data defining the content and sequence of function sets, is referred to as the rules for the decision management system. As described above, these rules are designed and entered by a system analyst on workstation 400 via a GUI.

The GUI preferably operates in conjunction with a relational data model using relational tables, such as look-up tables, so that data can be flexibly designed and modified via the GUI. In this manner, hard coded changes to the software are not required each time the system analyst changes the rules or the format of incoming/outgoing data.

Figure 17:
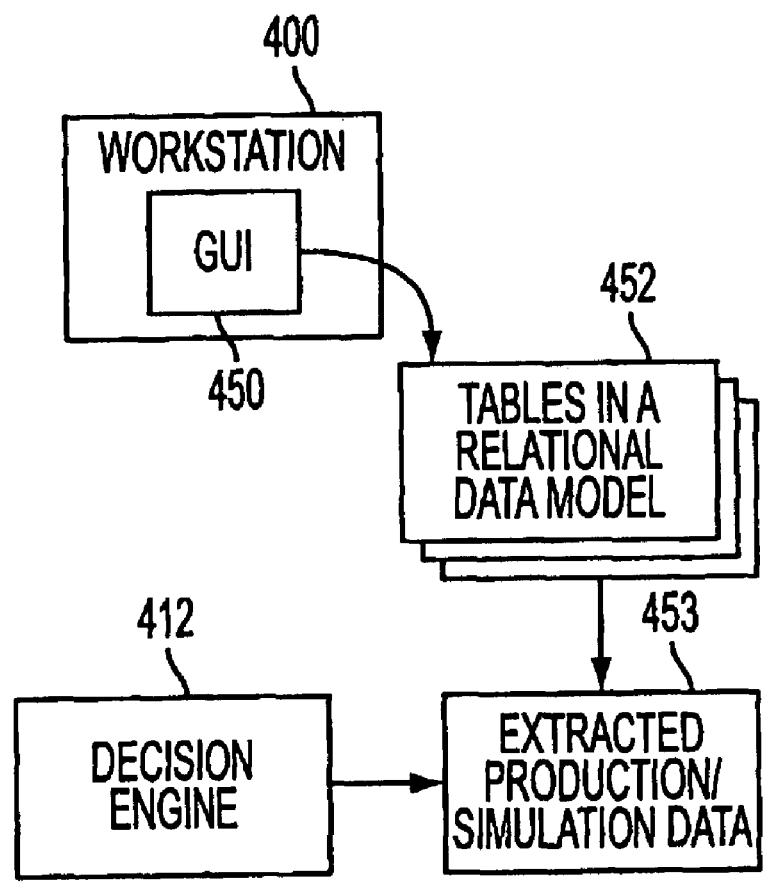
FIG. 17 is a diagram illustrating the use of a GUI and a relational data model, according to an embodiment of the present invention.

For example, FIG. 17 is a diagram illustrating the use of a GUI and a relational data model, according to an embodiment of the present invention. Referring now to FIG. 17, a user enters strategies by entering rules in a GUI 450 running on workstation 400. Thus, the rules constitute the strategies. The rules entered in GUI 450 are stored in a relational data model 452. Decision engine 412 retrieves the extracted strategies and other data from extracted production/simulation data 453, optimizes them for production, and performs appropriate operations. In a similar manner, the format of incoming/outgoing data can be entered on a GUI. The design of a GUI for entering rules and formatting data via a relational data model would be understandable by a person of skill in the art.

Figure 18:
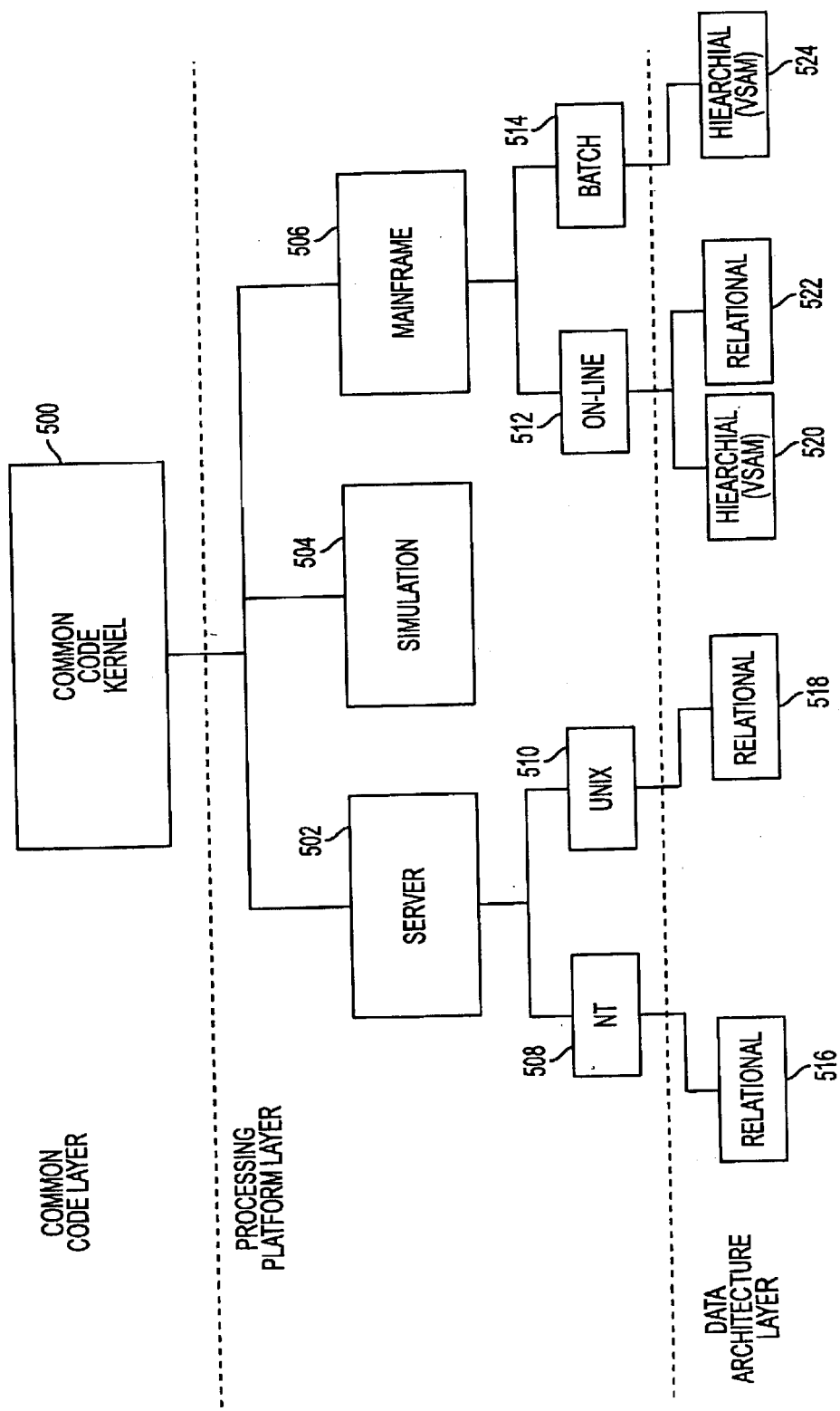
FIG. 18 is a diagram illustrating the software architecture of a decision management system, according to an embodiment of the present invention.

FIG. 18 is a diagram illustrating the software architecture of a decision management system, according to an embodiment of the present invention. Referring now to FIG. 18, the software architecture is divided into a common code layer, a processing platform layer and a data architecture layer.

The common code layer includes a common code kernel 500 which includes common code that runs across all the processing modes of the system. For example, common code kernel 500 runs across the simulation processing mode, the mainframe batch processing mode, the mainframe online processing mode and the client-server processing mode. Thus, common code kernel 500 is a core component of the software that is the same, and does not change, across all platforms. Common code kernel 500 provides the software processing to interpret and apply the rules, or strategies independent of the processing platform and data architecture. Thus, common code kernel 500 provides the software processing to interpret and apply, for example, decision trees, matrices, and to, for example, format outbound events and compute scores. The common kernel does not contain functionality specific to the Unix processing mode or relational data architecture.

The processing platform layer includes a server module 502, a simulation module 504 and a mainframe module 506. Server module 502 includes an NT module 508 and a UNIX module 510. Mainframe module 506 includes an on-line module 512 and a batch module 514.

Server module 502 operates with NT module 508 and Unix module 510 to support client-server processing modes typically running in Windows NT/95/98 and Unix platforms. Simulation module 504 supports simulation process modes. Mainframe module 506 operates with on-line module 512 and batch module 514 to support mainframe on-line and mainframe batch processing modes.

Therefore, the processing platform layer supports functionality specific to the processing mode and the hardware platform. For example, in a server platform, server module 502 supports such operations as reading and posting incoming/outcoming messages. In a mainframe platform, mainframe module 506 would typically support such operations as invoking the decision engine based on an incoming transaction. Other operations of processing platform layer modules might be, for example, to support memory management functions specific to the hardware platform and processing mode, and generally to accommodate differences in the operating system associated with the respective platform hardware.

The data architecture layer includes data modules required for storing and accessing data for the various types of hardware platforms and processing modes. For example, the data architecture layer includes relational data modules 516 and 518 which operate with the NT module 508 and Unix module 510, as Windows NT and Unix typically store and access data via relational mechanisms.

Regarding mainframe processing modes, the data architecture layer includes a (VSAM) data module 520 or a relational data module 522 for supporting mainframe on-line processing modes, and a (VSAM) data module 524 for supporting mainframe batch processing modes.

For example, in a mainframe platform, (VSAM) data module 520 would typically support operations such as building/searching through a VSAM data file based on a specific key. In a Unix platform, relational data module 518 would typically support operations such as running a query against an Oracle database to get customer information and/or parameters, or joining relational tables to identify the rules to apply to a specific customer.

Typically, for example, approximately 80% of the total code of the decision management system would be in the common code kernel 500, approximately 15% of the total code would be in the various modules of the processing platform layer, and approximately 5% of the total code would be in the various modules of the data architecture layer.

With the software architecture in FIG. 18, common code kernel 500 represents a common set of code that comprises decision engine 412 and data aggregation component 414. Common code kernel 500 does not change when it is run in different hardware platforms, and in different processing modes.

Figure 19:
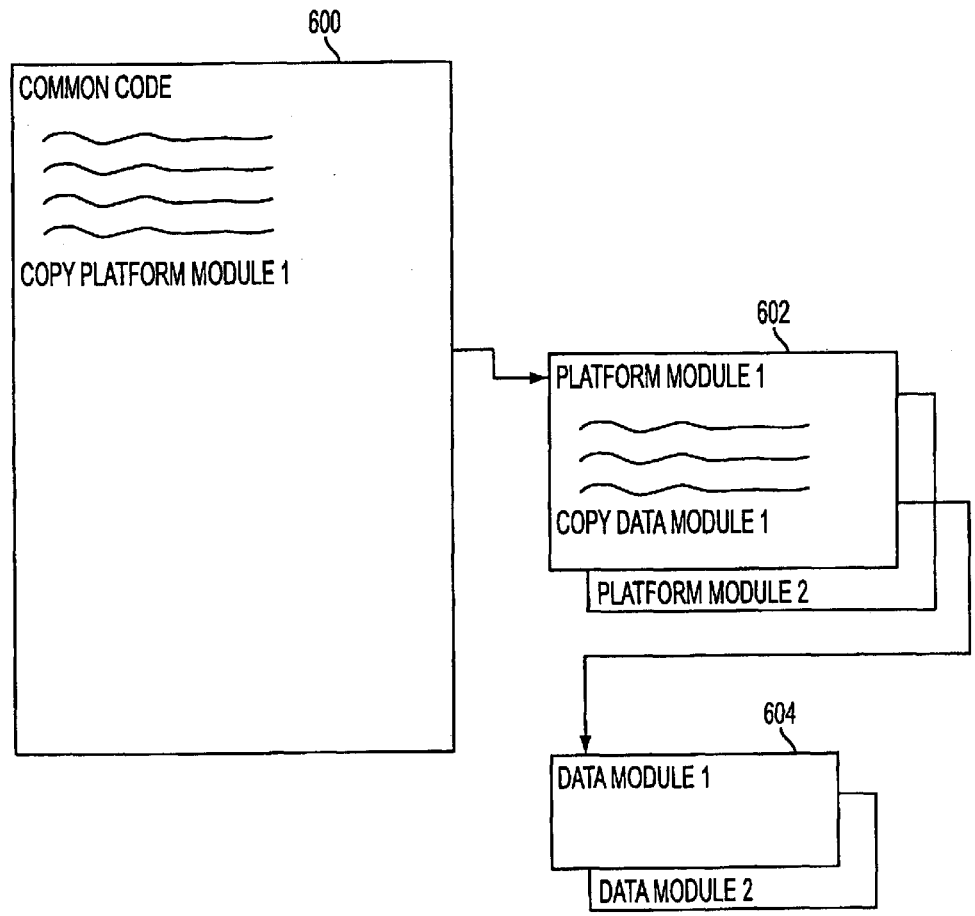
FIG. 19 is a diagram illustrating the linking of software modules of a decision management system, according to an embodiment of the present invention.

FIG. 19 is a diagram illustrating the linking of software modules of a decision management system, according to an embodiment of the present invention. For example, referring now to FIG. 19, a common code module 600 represents the code of the common code kernel 500 in FIG. 18. Common code module 600 should be a separate code module which is not intermixed with code of the processing platform layer or code of the data architecture layer. Instead, common code module 600 loads/references a platform module 602. Thus, platform module 602 could represent code from either server module 502, simulation module 504 or mainframe module 506. Platform module 602 then calls an appropriate data module 604 for the respective platform and data architecture. For example, data module 604 could represent code from the data modules in FIG. 18.

Therefore, it can be seen that each software module is preferably independent of the other software modules. These modules are then linked and compiled together in a required manner to provide the appropriate configuration. Therefore, common code kernel 500 in FIG. 18 is separated from the other code, and can be designed and enhanced as a core component that can run on each/all of the platforms.

Moreover, via the above hardware/software architecture, a single workstation, such as workstation 400 in FIG. 16, can enter a single set of rules which are propagated to any hardware platform for any processing mode of the decision management system.

A decision management system, as in the above embodiments of the present invention, is cross-function, cross-industry and cross-platform. The decision management system is cross-function since is not limited for use with a specific business function. Instead, the decision management system can be used for a variety of different business functions such as, for example, marketing, loan originations or collections.

The decision management system is cross-industry since it is not limited for use in a specific industry. Instead, the decision management system can be used for a variety of different industries such as, for example, insurance, financial services, government, telecommunications and transportation. The above-described GUI design and the manner in which it allows a user to enter and change rules is an important element which allows the decision management system to be cross-function and cross-industry.

The decision management system is cross-platform since it is not limited for use in a specific hardware environment or with a specific processing mode. Instead, the decision management system can run simultaneously on a variety of different hardware platforms and in a variety of different processing modes. The software architecture in FIGS. 18 and 19 allows the decision management system to be cross-platform.

A decision management system is described above as being embodied, for example, in software stored in a computer-readable medium, such as a memory of a computer. However, a computer-readable medium is not intended to be limited to a memory of a computer. Instead, a computer-readable medium can be, for example, a computer disk, an optical disk or any other medium which is readable by a computer.

Therefore, according to the above embodiments of the present invention, a computer implemented decision management system applies strategies to determine actions to be taken, monitors performance based on the taken actions, and refines the strategies in accordance with the monitored performance. The decision management system has associated software and hardware architectures. The software architecture includes a common code layer, a processing platform layer, and a data architecture layer. The common code layer includes common code simultaneously operable on first and second hardware platforms which are different from each other, and provides software processing to interpret and apply the strategies. The processing platform layer includes a first software module supporting a processing mode for the first hardware platform, and a second software module supporting a processing mode for the second hardware platform. The data architecture layer includes a first data module supporting data storage and access by the first software module, and a second data module supporting data storage and access by the second software module. A graphical user interface allows a user to enter and change strategies and inbound/outbound data definitions without technical intervention.

Here, the term "without technical intervention" indicates that the strategies can be changed without changes to the software's code or environment in which it operates that would require a technical understanding of the product's architecture or leveraged technology. In other words, new software code does not have to be written to make the changes. Instead, the changes are driven by the system user through the use of a GUI and relational tables. This allows a system user to change strategies via, for example, a simple graphical user interface or other type of user interface, instead of requiring a software programmer to create or change the written software code or physically move archived data structures.

The present invention relates to a rules based decision management system. Here, the terms "decision management system" or "rules based decision management system" refers to computer implemented systems which apply strategies to determine actions to be taken, monitor performance based on the taken actions, and provide a manner to refine the strategies in accordance with the monitored performance.

According to an example described herein, a decision management method and apparatus (a) assigns clients of an organization into categories and test groups so that the clients are conceptually representable in a data structure equivalent to a matrix having first and second axes with the categories on the first axis and the test groups on the second axis, the intersection of each category and test group in the matrix defining a test cell; (b) applies different strategies to clients within different test cells; and (c) tracks the movement of clients between categories as a result of the applied strategies.

As indicated above, the clients are "conceptually representable" in a data structure equivalent to a matrix. Thus, it is not necessary to physically create a matrix. Instead, the strategies should simply be applied to the clients in a manner which corresponds to that "conceptualized" by the matrix.

The test groups and categories are not intended to be limited to the specific examples included herein, and instead can be flexibly designed, for example, based on the business of the organization. For example, Bronze, Gold and Platinum are described herein as being categories. However, the present invention is not intended to be limited to use with these specific category names. Moreover, the applied strategies are not intended to be limited to any specific decision tree structure described herein as an example.

A decision management system according to the above embodiments of the present invention allows strategies to be developed which move clients of an organization from one category of clients to another. Different strategies are applied to clients within different strategy test cells. Then, the movement of clients between strategy test cells can be monitored, so that the strategies can be appropriately modified to control the movement of clients between categories.

The present invention is not intended to be limited to controlling the movement of clients across categories, and movement is not the only reason to apply strategies. Instead, strategies can be applied, for example, simply to increase the client value over time to the organization. For example, two distinct report groups may result in different delinquency rates for clients of a company. Changing the overall strategy to include the strategy which yields the lower delinquency rate does not necessarily imply movement of a client across client categories. The client may stay, for example, in a "Bronze" category, but the overall effectiveness of the portfolio of clients may have been statistically improved. Therefore, in this example, the client value over time to the company has been increased.

A decision management system according to the above embodiments of the present invention is significantly different and more evolved than the system described in FIGS.

1–7. For example, the system described in FIGS. 1–7 does not create or conceptualize a data structure equivalent to a matrix of categories and test groups, and thereby does not allow different strategies to be applied to different strategy test cells of the matrix. Further, a system as described in FIGS. 1–7 does not track movement of clients between categories, or modify strategies based on the tracked movement to control movement of clients between categories. In addition, a system as described in FIGS. 1–7 has no OLAP capability to perform multidimensional analysis on strategy results and thus explain positive/negative strategy performance across multiple, user-defined dimensions. Moreover, a system as described in FIGS. 1–7 is not cross-platform. Therefore, a system as in FIGS. 1–7 cannot provide advantages of the present invention, particularly in being implemented for many functions across many industries and on multiple platforms. Instead, it is limited to very tactical analysis.

An example is presented herein of a decision management system which creates a matrix to apply strategies to control the movement of clients between categories. However, the present invention is not intended to be limited to this specific example, and can be applied to many different types of decision management systems which perform many different types of functions for many different purposes. Therefore, generally, the present invention is applicable to a computer implemented decision management system which applies strategies to determine actions to be taken, monitors performance based on the taken actions, and refines the strategies in accordance with the monitored performance. The decision management system is not intended to be limited to applying any specific strategies, in any specific manner, to achieve any specific purpose.

Moreover, the many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An apparatus comprising:
  a computer implemented cross-industry, cross-function decision management system applying strategies to determine actions to be taken with respect to clients of an organization, monitoring performance of the applied strategies based on the taken actions, and refining the strategies in accordance with the monitored performance, the decision management system including
    a software architecture including a common code layer including a software code kernel, and
    a hardware architecture including first and second hardware platforms based on different technical standards, respectively, the software code kernel being a same code across the first and second hardware platforms and thereby running simultaneously across the first and second hardware platforms,
  wherein the software architecture further includes
    a processing platform layer including a first software module supporting a processing mode for the first hardware platform, and a second software module supporting a processing mode for the second hardware platform, and
    a data architecture layer including a first data module supporting data storage and access by the first software module, and a second data module supporting data storage and access by the second software module.
  the processing platform layer being above the data architecture layer, and the common code layer being above the processing platform layer in the software architecture,
  the common code layer, the processing platform layer and the data architecture layer thereby operating together to allow the decision management system to operate cross-platform.

2. An apparatus as in claim 1, wherein each of the first and second hardware platforms is one of an IBM mainframe platform, a Window-based platform and a Unix platform.

3. An apparatus as in claim 2, wherein the first and second hardware platforms are operable in first and second processing modes, respectively, the first and second processing modes being different from each other.

4. An apparatus as in claim 1, wherein the first and second hardware platforms are operable in first and second processing modes, respectively, the first and second processing modes being different from each other.

5. An apparatus as in claim 4, wherein each of the first and second processing modes is one of a simulation processing mode, a mainframe batch processing mode, a mainframe online processing mode, and a client-server processing mode.

6. An apparatus as in claim 1, wherein the decision management system produces data which is output to an external system, the decision management system further comprising:
  a user interface allowing a user to set the format of the output data without technical intervention.

7. An apparatus as in claim 1, wherein the decision management system further comprises:
  a user interface running on a single terminal and allowing a user to enter strategies which are applied across each of the first and second hardware platforms.

8. An apparatus as in claim 1, wherein the software code kernel provides software processing to interpret and apply strategies.

9. An apparatus comprising:
  a computer implemented cross-industry, cross-function decision management system applying strategies to determine actions to be taken with respect to clients of an organization, the decision management system having a decision engine to apply the strategies, the decision management system having a software architecture including
    a common code layer including a common code kernel simultaneously operable on first and second hardware platforms based on different technical standards, respectively, the common code kernel being the same code across the first and second hardware platforms and providing software processing to interpret and apply the strategies, the common code layer including the decision engine,
    a processing platform layer including a first software module supporting a processing mode for the first hardware platform, and a second software module supporting a processing mode for the second hardware platform, and
    a data architecture layer including a first data module supporting data storage and access by the first software module, and a second data module supporting data storage and access by the second software module, wherein the processing platform layer is above the data architecture layer and the common code layer is above the processing platform layer in the software architecture, the common code layer, the processing platform layer and the data architecture layer thereby operating together to allow the decision management system to operate cross-platform.

* * * * *

UNITED STATES PATENT AND TRADEMARK OFFICE
CERTIFICATE OF CORRECTION

PATENT NO. : 7,062,757 B2
APPLICATION NO. : 10/434344
DATED : June 13, 2006
INVENTOR(S) : Laurence Honarvar et al.

It is certified that error appears in the above-identified patent and that said Letters Patent is hereby corrected as shown below:

Col. 24, line 5, after "module" delete "." and insert --,-- therefor.

Signed and Sealed this

Twenty-first Day of November, 2006

JON W. DUDAS
*Director of the United States Patent and Trademark Office*